L. S. BURBANK.
AUTOMATIC FILLING CHANGING LOOM.
APPLICATION FILED NOV. 23, 1917.

1,294,872.

Patented Feb. 18, 1919.
12 SHEETS—SHEET 1.

Inventor:
Louis S. Burbank.

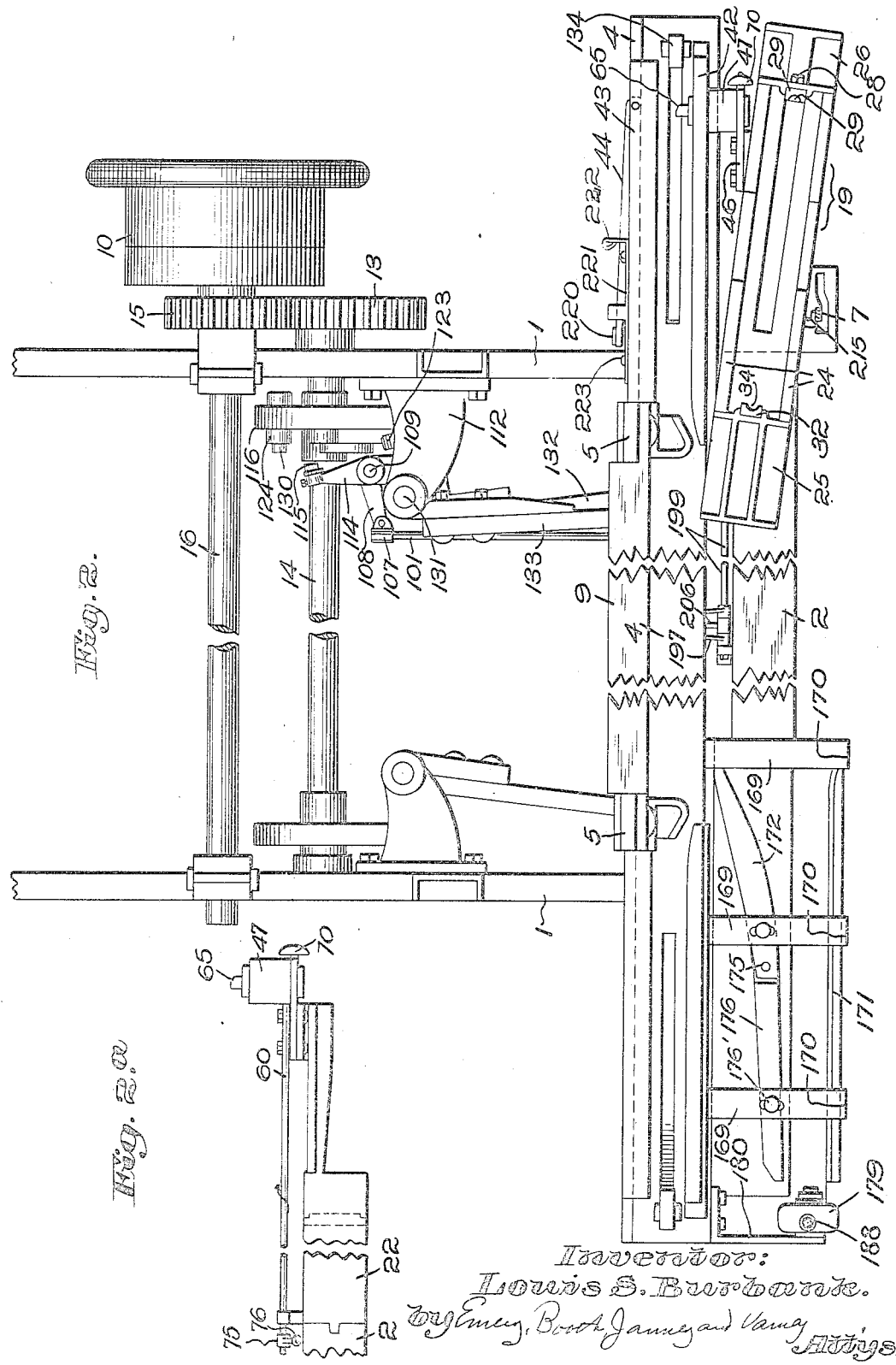

L. S. BURBANK.
AUTOMATIC FILLING CHANGING LOOM.
APPLICATION FILED NOV. 23, 1917.
1,294,872.
Patented Feb. 18, 1919.
12 SHEETS—SHEET 3.
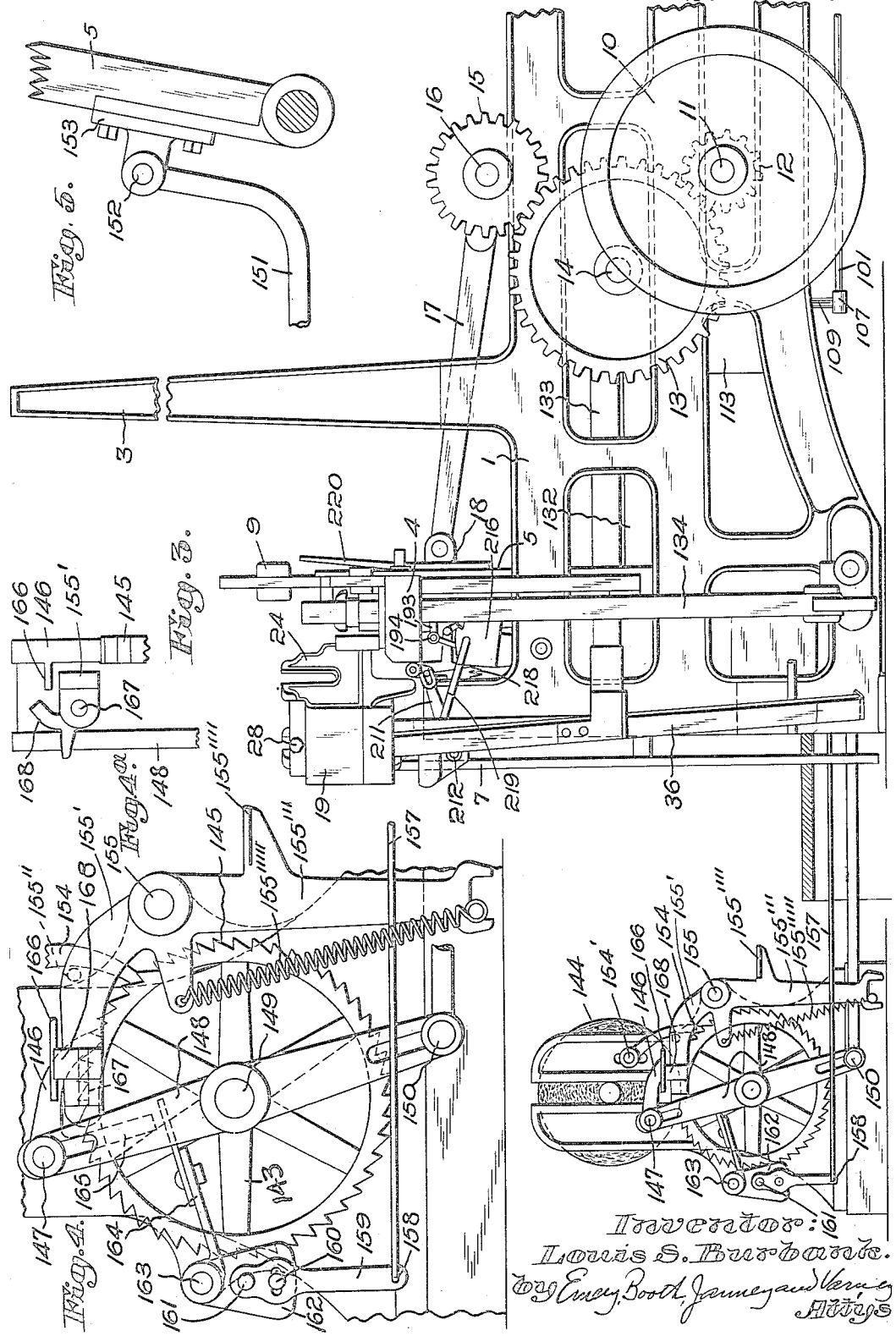

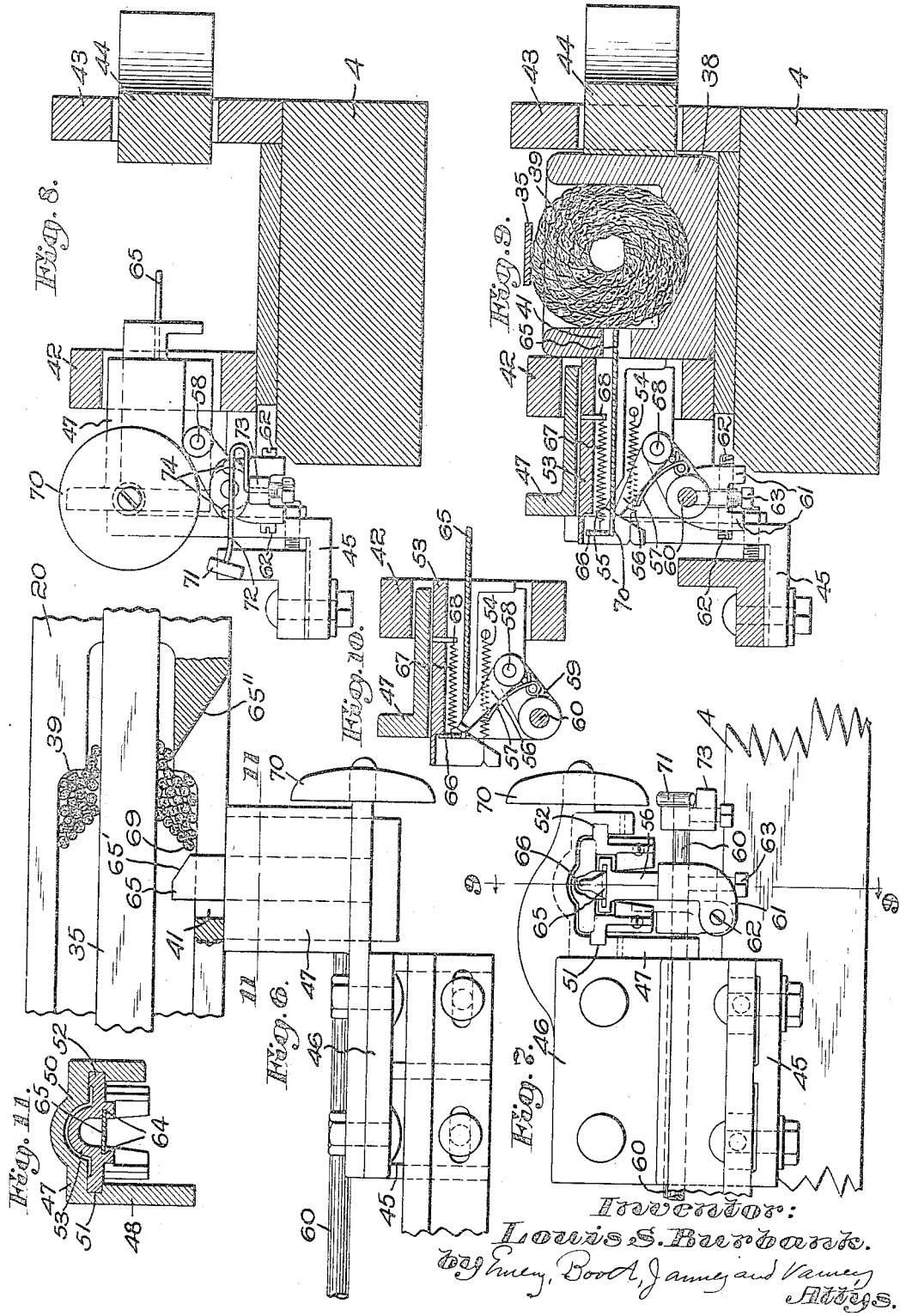

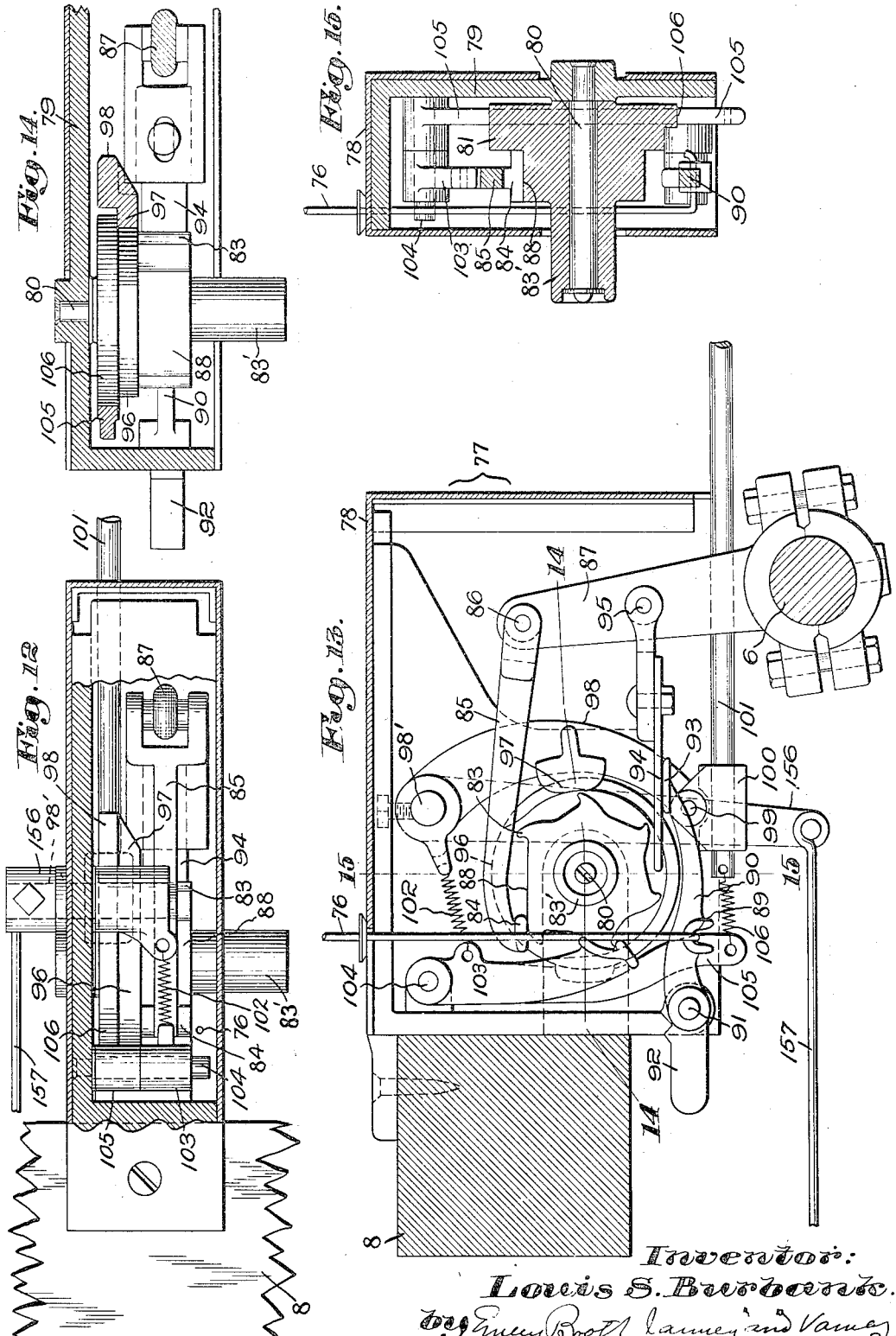

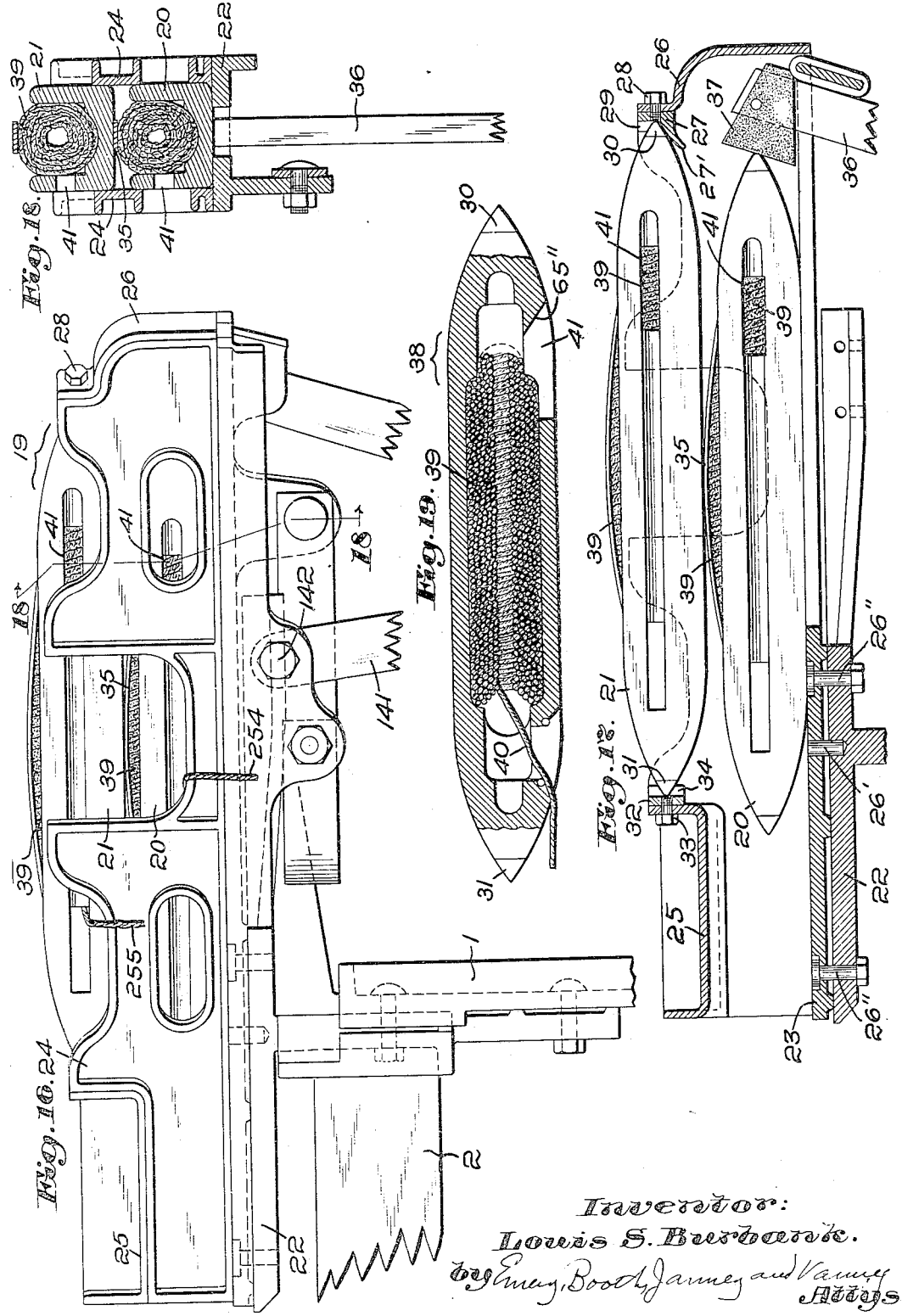

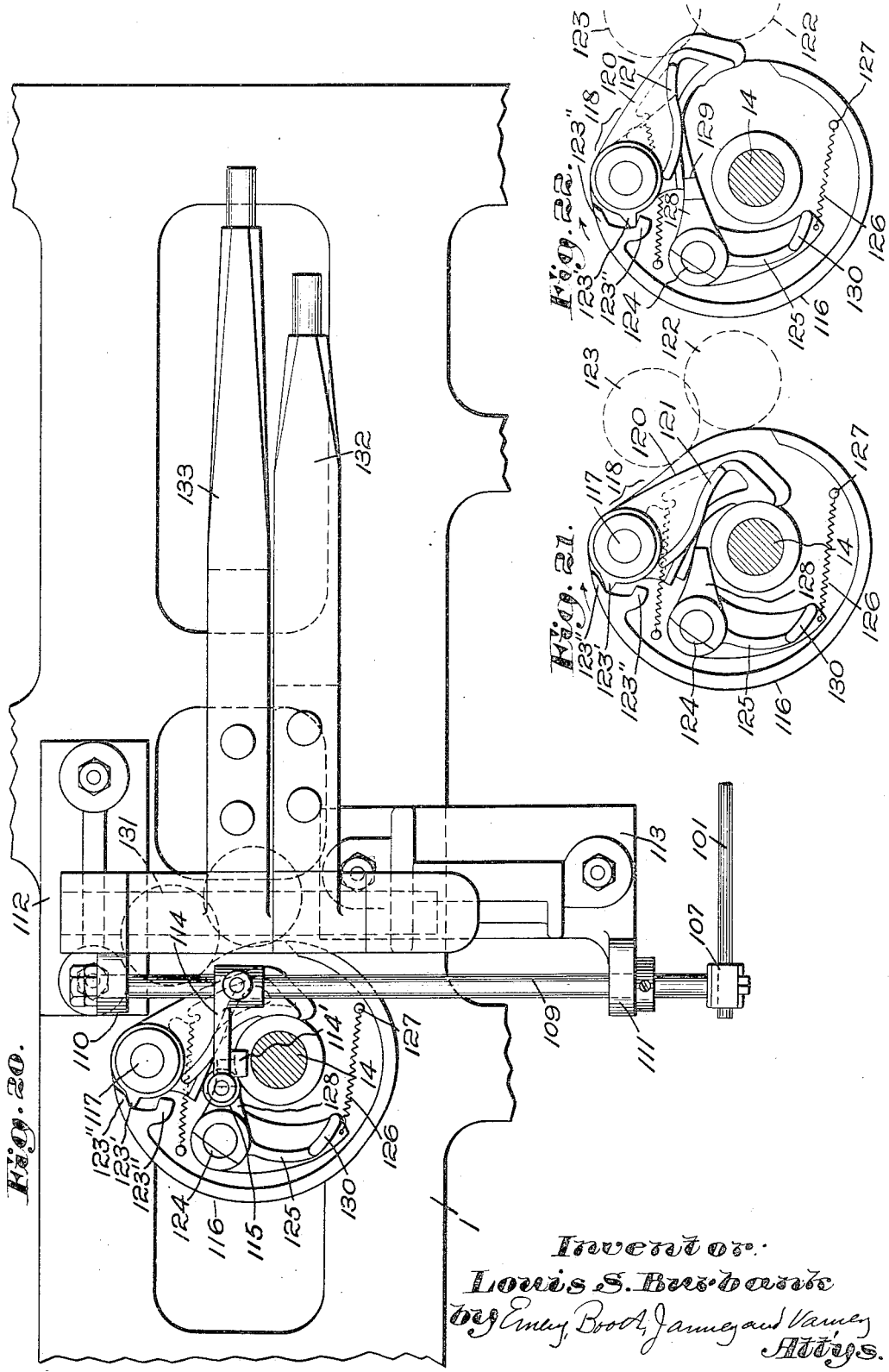

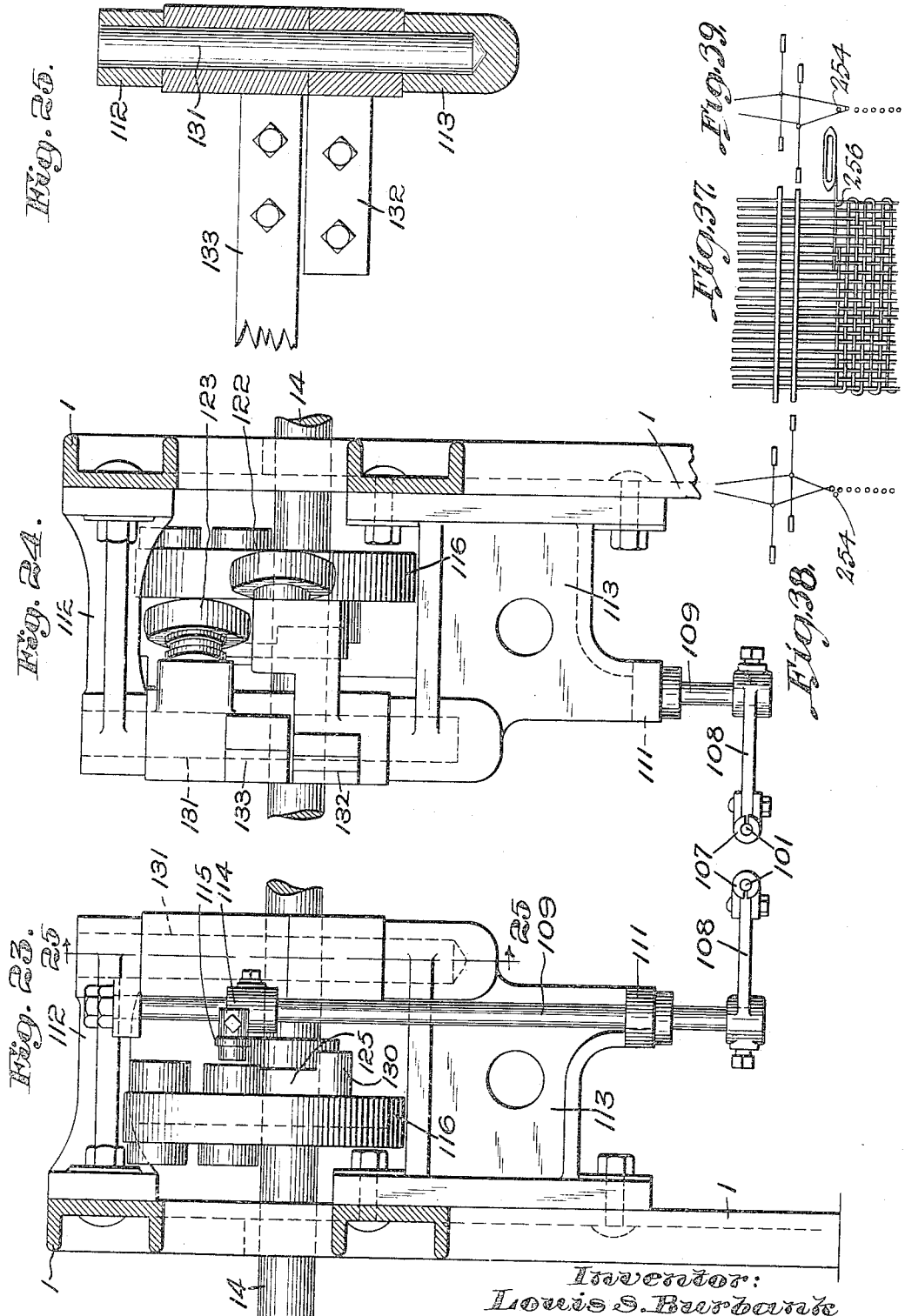

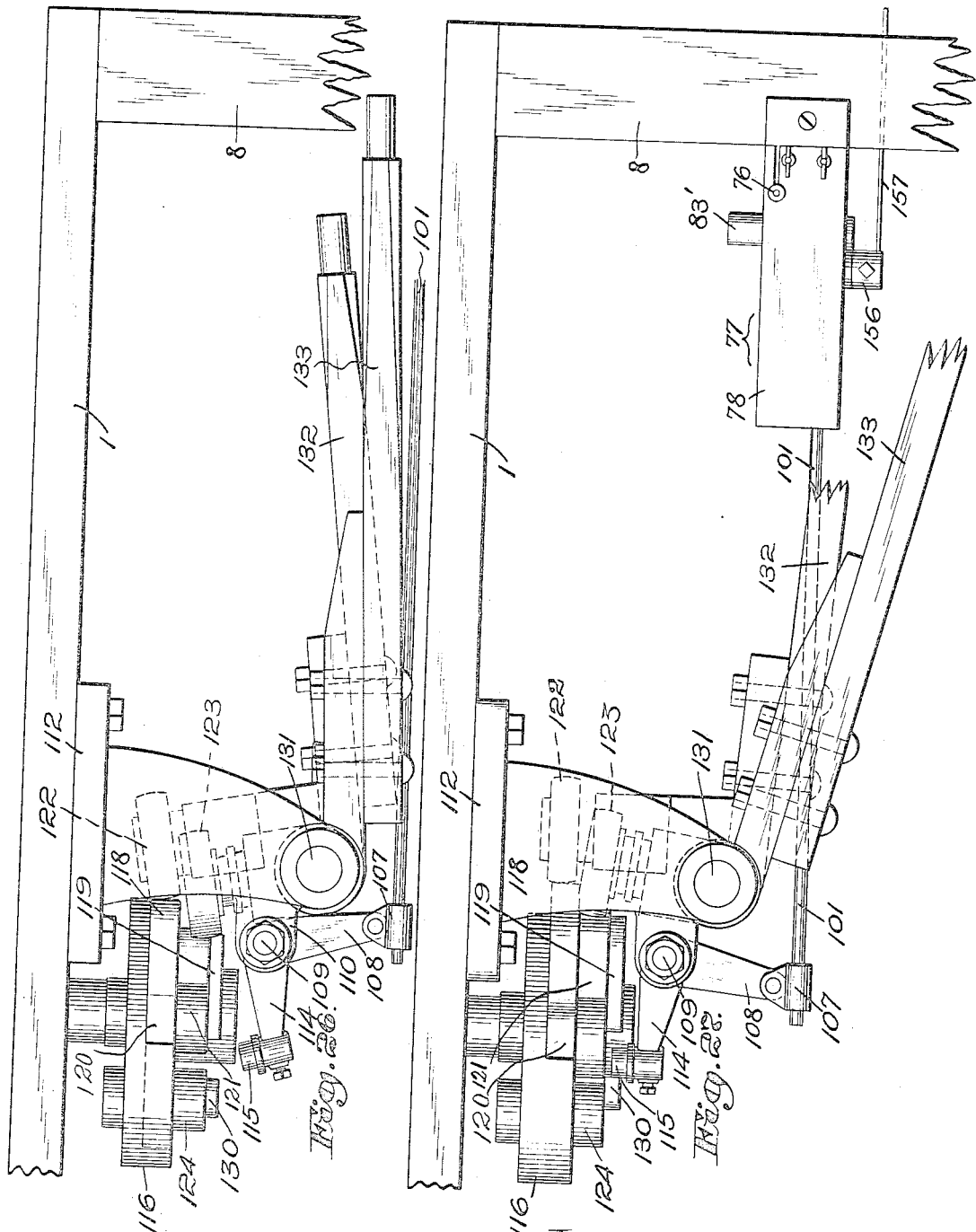

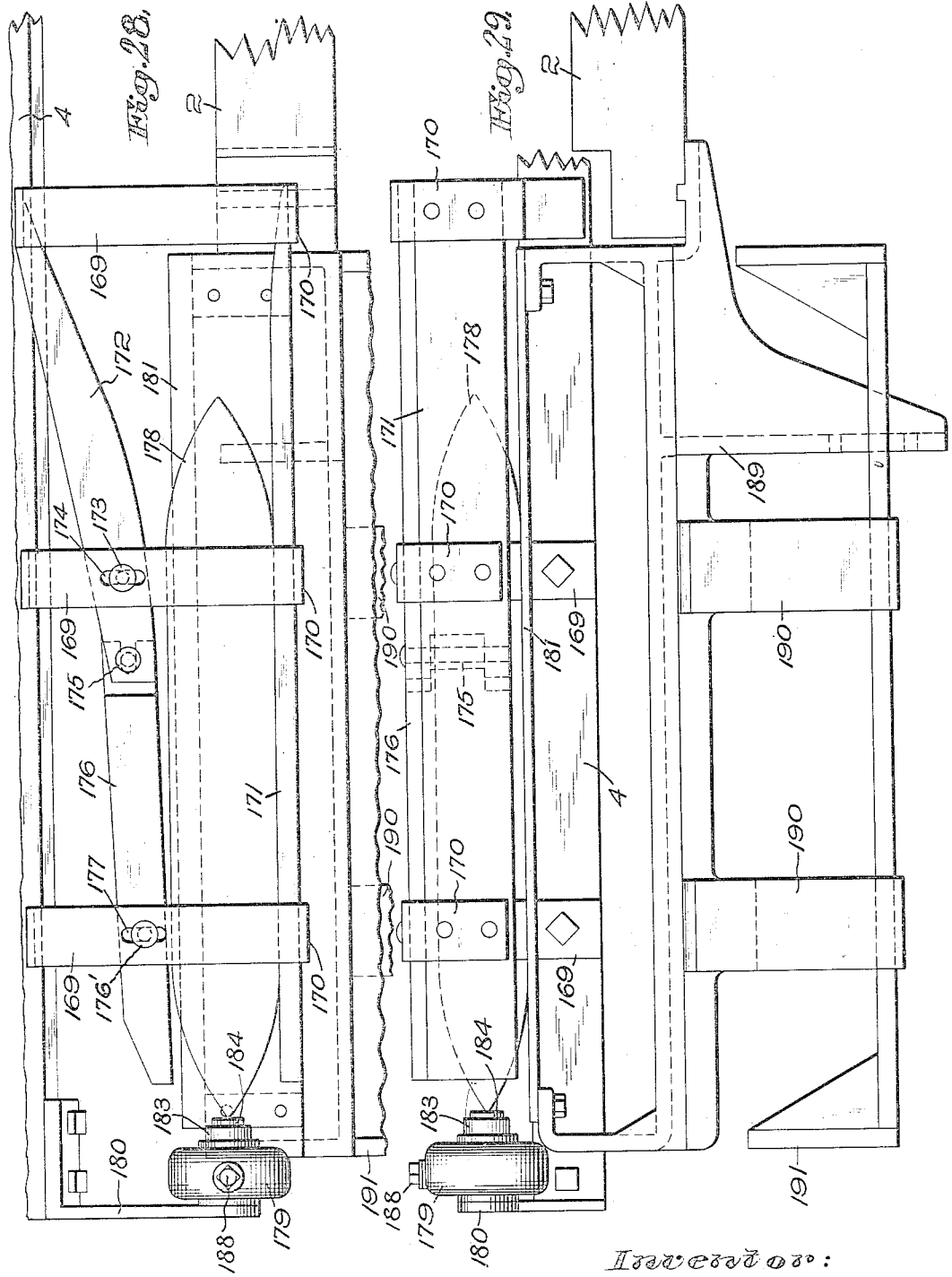

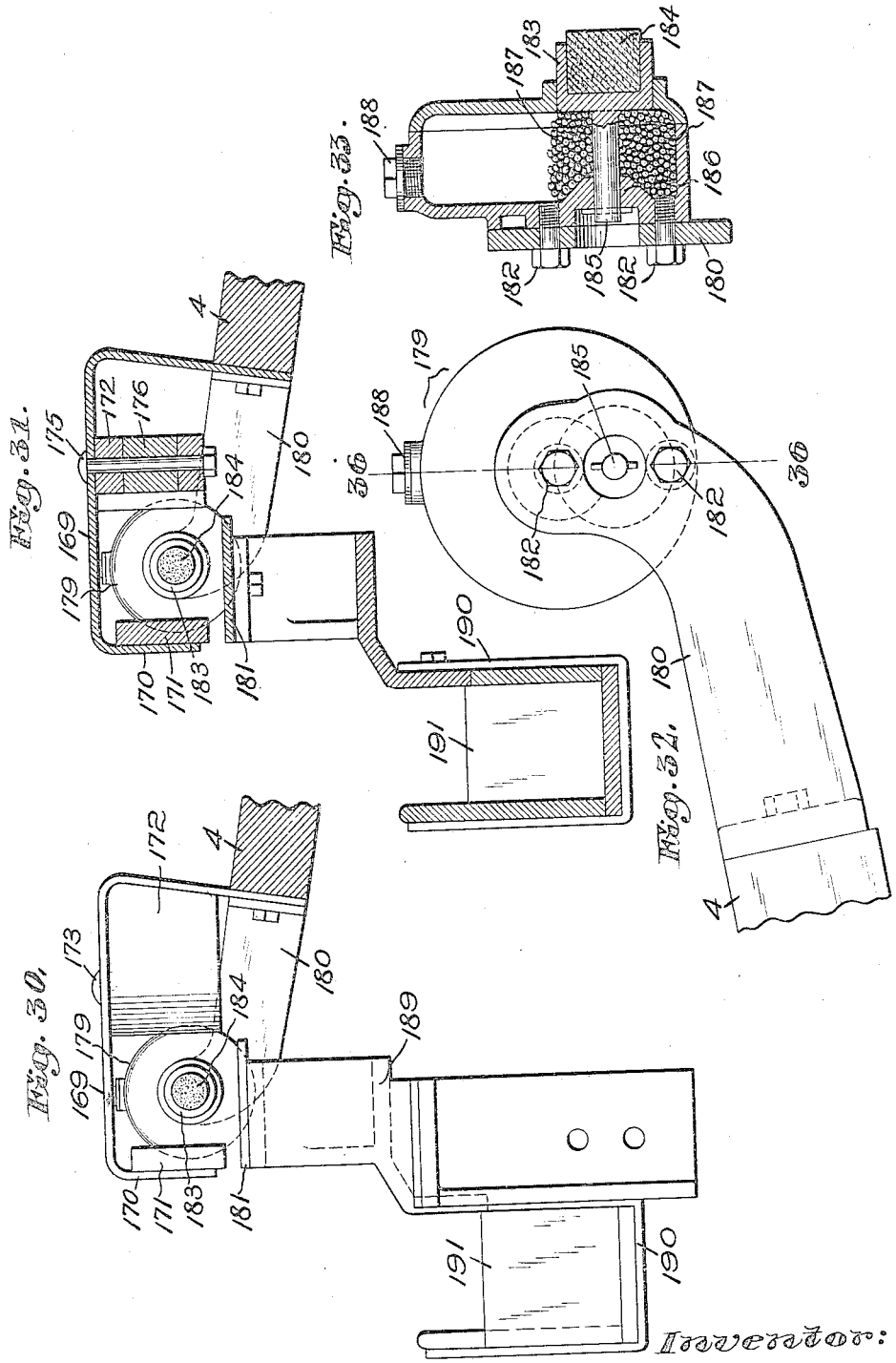

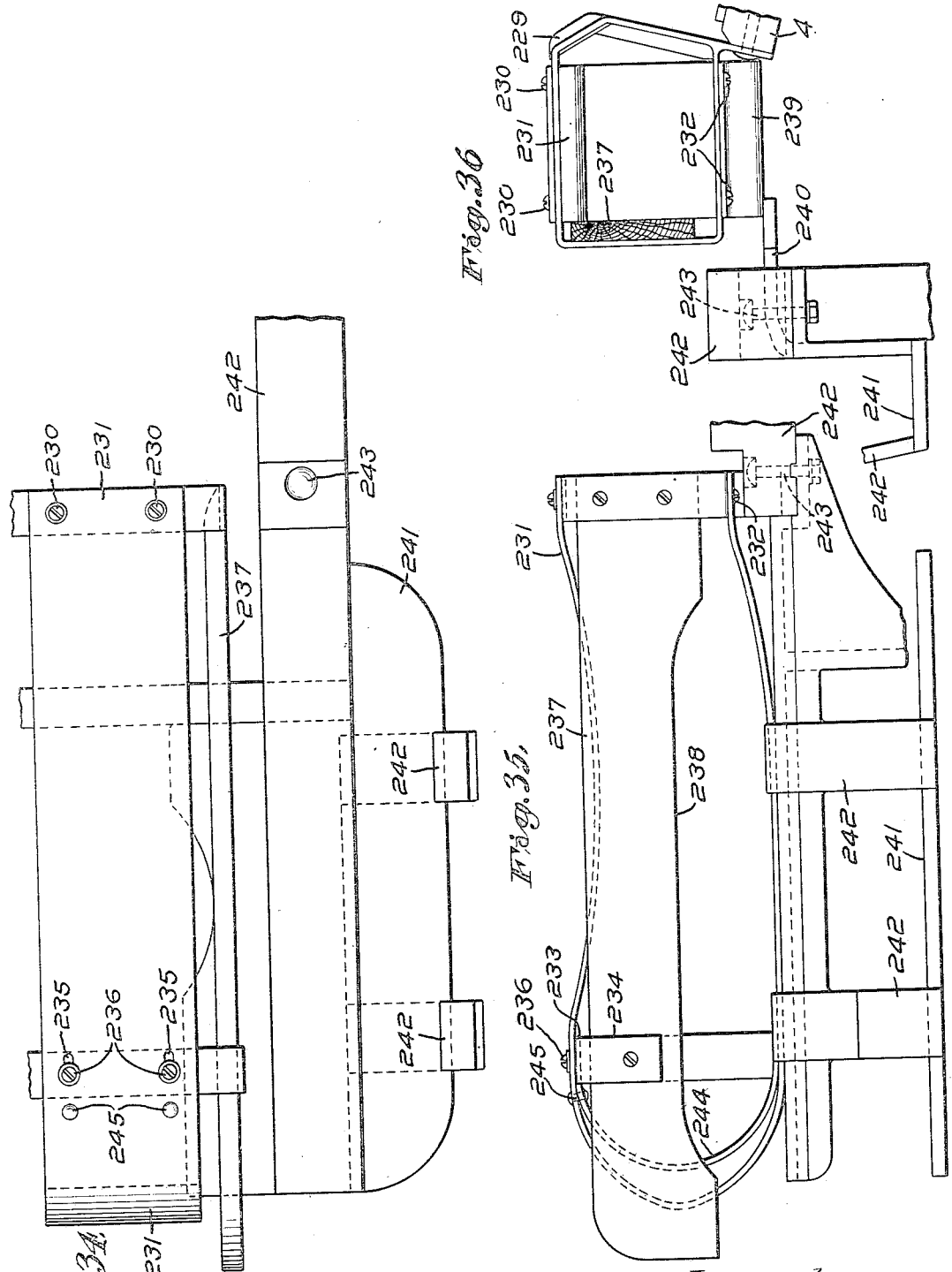

UNITED STATES PATENT OFFICE.

LOUIS S. BURBANK, OF LUDLOW, MASSACHUSETTS, ASSIGNOR TO LUDLOW MANUFACTURING ASSOCIATES.

AUTOMATIC FILLING-CHANGING LOOM.

1,294,872.          Specification of Letters Patent.      Patented Feb. 18, 1919.

Application filed November 23, 1917. Serial No. 203,497.

*To all whom it may concern:*

Be it known that I, LOUIS S. BURBANK, a citizen of the United States, and a resident of Ludlow, in the county of Hampden and State of Massachusetts, have invented an Improvement in Automatic Filling-Changing Looms, of which the following description, in connection with the accompanying drawings, is a specification, like characters on the drawings representing like parts.

This invention relates to looms and particularly to automatic filling changing looms, and more especially to automatic filling changing looms of that type wherein the exhausted or substantially exhausted filling is replenished by replacing the running shuttle with a new shuttle.

In order that the principle of the invention may readily be understood, I have disclosed a single embodiment thereof in the accompanying drawings wherein:

Fig. 2 is a plan view of the loom shown in Fig. 1;

Figure 1:
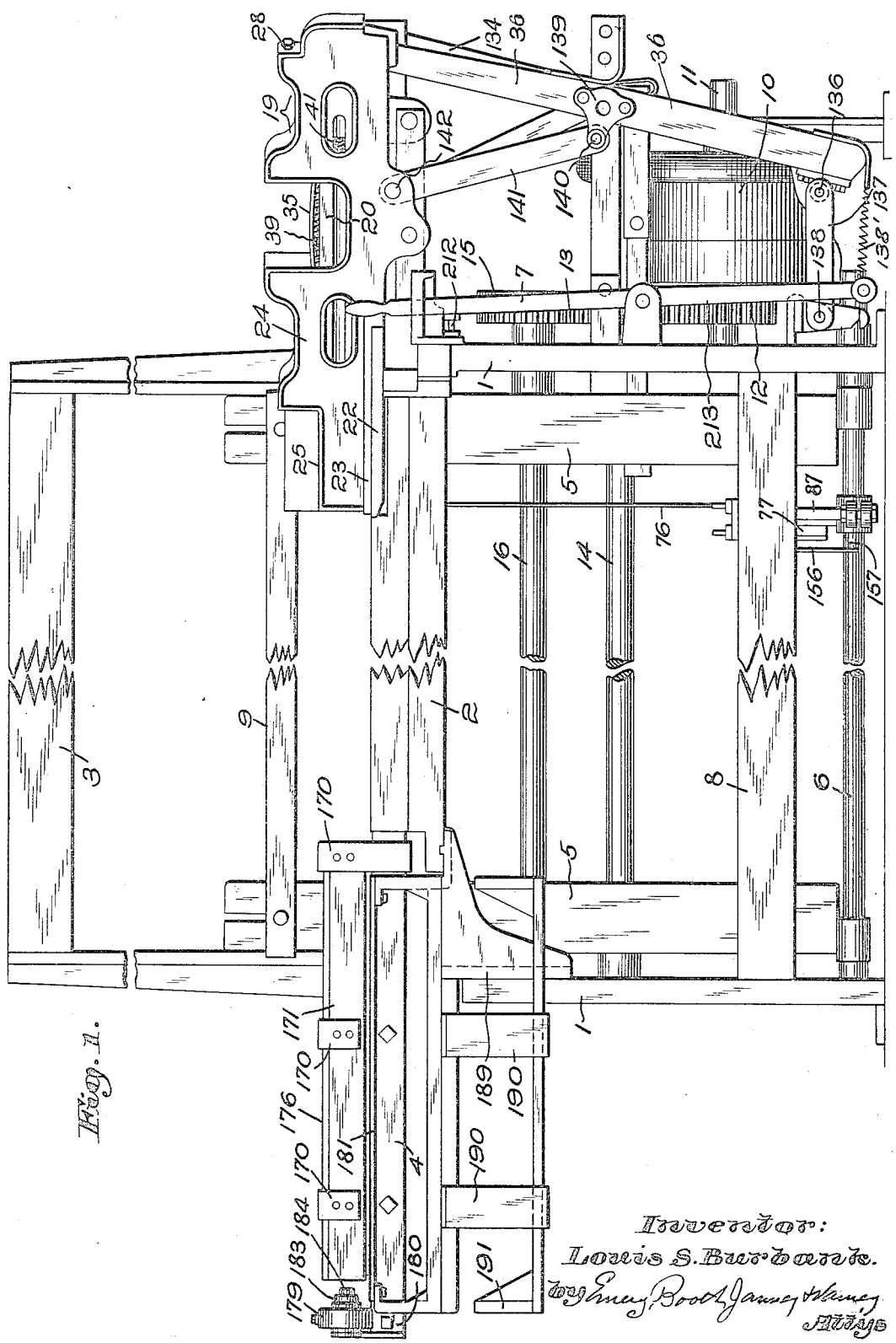
Figure 1 is a front elevation of an automatic filling changing loom having my invention applied thereto.

Fig. 2ᵃ is a detail mainly in plan of the filling package feeler and related parts;

Fig. 3 is a side elevation of the loom shown in Fig. 1;

Fig. 4 is a detail in side elevation on an enlarged scale, of the take-up mechanism preferably employed by me;

Fig. 4ᵃ is a detail representing a portion of the mechanism shown in Fig. 4;

Fig. 5 is a detail in vertical section showing the connection to the take-up mechanism;

Fig. 6 is a detail mainly in plan of the filling package feeler and closely related parts;

Fig. 7 is a front elevation of the construction shown in Fig. 6;

Fig. 8 is an end elevation of the mechanism shown in Fig. 6 and showing the lay and shuttle box in vertical section;

Fig. 9 is a vertical section upon the line 9—9 of Fig. 7 and showing the feeler, the shuttle and the shuttle box;

Fig. 10 is a vertical section taken through the feeler mechanism and showing the feeler in indicating position;

Fig. 11 is a transverse section taken through the feeler;

Fig. 12 is a plan view of the cycle box with the top thereof removed;

Fig. 13 is a view mainly in side elevation and partly in vertical section, of the cycle box and related parts;

Fig. 14 is a longitudinal section upon the line 14—14 of Fig. 13;

Fig. 15 is a vertical section upon the line 15—15 of Fig. 13;

Fig. 16 is a view in side elevation of the support for the spare shuttles;

Fig. 17 is a view in vertical section of said support and showing two shuttles therein in side elevation;

Fig. 18 is a view in transverse section taken through said spare shuttle support and the two shuttles therein;

Fig. 19 is a longitudinal section view taken through a shuttle and the filling package therein;

Fig. 20 is a view mainly in side elevation of a portion of the picking mechanism for the regular and the supplemental picker arms;

Figs. 21 and 22 are views in side elevation and vertical section of the picker cams, and showing the parts differently positioned;

Fig. 23 is a view partially in vertical section and partly in elevation, looking at Fig. 20 from the left;

Fig. 24 is a similar view, but looking at Fig. 20 from the right;

Fig. 25 is a section upon the line 25—25 of Fig. 23;

Figs. 26 and 27 are plan views showing the parts differently positioned, of a portion of the picker mechanism for the new and for the exhausted shuttles;

Fig. 28 is a plan view of the receptacle or receiver for the exhausted shuttle and showing the exhausted shuttle therein;

Fig. 29 is a front elevation of the construction shown in Fig. 28;

Fig. 30 is a view thereof mainly in end elevation;

Fig. 31 is a vertical section thereof;

Fig. 32 is a view in end elevation of the bunter, preferably employed with the spare shuttle receiver;

Fig. 33 is a vertical section upon the line 36—36 of Fig. 32; and

Fig. 34 is a plan view of another form of spent shuttle receiver that may be employed in the practice of my invention and which I preferably employ;

Fig. 35 is a side elevation with parts broken away of the construction shown in Fig. 34;

Fig. 36 is a transverse section of the construction shown in Figs. 34 and 35;

Fig. 37 is a diagram indicating the manner in which the trailing end of the new filling is caught by the closing shed;

Fig. 38 is a diagrammatic section taken through the weft threads and harness and indicating the position of the trailing weft as it passes over the shed from the shuttle support; and Fig. 39 is a similar view indicating the manner in which the trailing end is caught by the closing shed.

The loom of my invention and one form of which is herein disclosed may be used in various relations and for weaving various kinds of material. It is, however, so far as the disclosed embodiment is concerned, particularly adapted for weaving jute and other coarse and heavy fibers in the manufacture of gunny bagging.

In carrying out my invention the filling may be replenished in any suitable manner, but preferably by replacing the exhausted or substantially exhausted shuttle with a refilled shuttle. The filling supply may be in any suitable form or package, but in that type of loom to which I have particularly applied my invention the filling supply is in the form of a bobbinless cop or package of yarn coiled into a generally cylindrical mass having nested conical layers and having preferably more or less tapered ends and forced usually with considerable pressure into the shuttle, which may be and usually is of large size, the construction being such that the filling package tightly fits in the cavity of the shuttle throughout the entire length of such package, and cannot be displaced in the operation of the mechanism even when the portion of the filling package remaining in the shuttle is extremely small, and the shuttle has become substantially exhausted.

In an ordinary loom there is a brief time in the lay stroke when both boxes may be emptied of the shuttle and still not interfere with the picking or dagger actions of the loom, and the loom will run on uninterruptedly if the shuttle be restored to its original place at or before the expiration of such time. The limits of the period referred to are the passing of the frogs by the daggers on the forward stroke of the lay and the beginning of the picking action on the following back stroke of the lay.

If the filling motion be suspended for one pick, or if there be no filling motion on the loom, the empty shuttle may be discharged from its box during the period referred to, and a refilled shuttle may be inserted in the opposite box. Such refilled shuttle may be put into the opposite box by sending it into the shed or without passing it through the shed provided the action of the filling motion be suspended temporarily and the take-up motion be similarly suspended.

The disclosed embodiment of my invention is based upon such general principle of operation and the removal of the empty shuttle and the entry of the refilled shuttle preferably take place during the period referred to, although it is clearly to be understood that my invention is not limited to such timing or arrangement of the parts. Although I have shown my invention as applied to a shuttle having a bobbinless cop or package, it is to be understood that my invention is in no wise limited thereto.

In a previous application filed by me I have disclosed means whereby the spare shuttle is supported at one side of the loom and in the replenishing operation is picked across the loom into the opposite box, the exhausted shuttle being discharged from the loom at the same side thereof where the spare shuttle is supported. In the disclosed embodiment of the present invention, the spare shuttle is supported at one side of the loom and in the replenishing operation is picked across the loom into the opposite box, and the exhausted shuttle is picked from the shuttle box at the spare shuttle side of the loom across the loom into a receiver or receptacle which is at the same side of the loom as the shuttle box into which the spare shuttle is picked in the replenishing operation.

Referring more particularly to the drawings, the sides of the loom are represented at 1, the breast beam at 2, the loom arch at 3, the lay at 4, the lay swords at 5, the rocker shaft at 6, the shipper at 7, the bottom girt of the loom at 8, and the hand rail at 9. These parts may be of any suitable construction.

Power may be applied to the loom in any suitable manner and preferably by means of a driving pulley 10, shown most clearly in Figs. 2 and 3 and having fast and loose pulley members. Said driving pulley 10 is upon a drive shaft 11, having thereon a driving pinion 12, meshing with a gear 13, upon the cam shaft 14. Said gear 13 meshes with a gear 15 upon the crank shaft 16. The cranks of said shaft are connected in the usual manner by the sweeps 17 to the bracket 18 at the back of the lay, as most clearly shown in Fig. 3. These parts may be of the usual construction.

Preferably I effect replenishment, as previously stated, by discharging the substantially exhausted shuttle and by introducing a new or replenishing shuttle. For that purpose, I have herein represented a support generally indicated at 19, for the spare shuttle or shuttles, and in this form of my invention I have represented two spare shuttles 20 and 21, in vertical alinement, and so arranged that the upper shuttle 21 may drop into place as soon as the lower spare shuttle 20 is picked from its support. As most clearly indicated in Fig. 2, the spare or replenishing shuttle box is supported in a horizontal plane, but at an incline to the face of the reed when the latter is in a vertical position. The said spare shuttle box 19 is supported by means of a bracket 22, which as shown most clearly in Fig. 16 is supported from the breast beam and loom side. The said spare shuttle box has a bottom 23, bolted to the bracket 22, sides 24 and two members 25 and 26 constituting a cover.

Preferably I provide means for effecting adjustment of the spare shuttle box 19 so that it may be brought into correct alinement. For this purpose I have represented on the bottom 23 of the spare shuttle box 19 a pivot pin 26', upon which it may be turned in a horizontal plane. To permit such movement the bolts 26'' extend to suitable elongated slots in the said bottom 23 and may be tightened in any position of adjustment of said box 19.

The uppermost spare shuttle 21 is supported at its rear end or tip by a small bracket or member 27 secured by bolt 28 to the cover member 26, and having a vertical slot 29 extending part way through said member or bracket 27, and wherein is received the tip 30 of the said spare shuttle 21. The said bracket or member 27 is preferably formed with a downwardly inclined or slanting part 27' along and from which the tip of the shuttle will slide when the opposite tip of the shuttle is no longer supported. The opposite tip 31 of the shuttle is frictionally supported in a bracket or member 32 secured by bolt 33 to the cover member 25, and having a vertical slot 34 extending entirely therethrough. The bracket or member 32 merely positions the forward end of the shuttle 31 and said shuttle rests by gravity upon the underneath spare shuttle 20 or rather upon the spring tongue or strip 35, which confines the filling package in place. When the lowermost spare shuttle 20 is picked from the spare box 19, the uppermost spare shuttle 21 drops into the place vacated by the spare shuttle 20 and another spare shuttle is placed by hand thereon. Each spare shuttle in turn is picked from the spare box 19 by the supplemental picker arm 36, hereinafter more fully described, and having a picker 37, which during its inward sweep temporarily supports the inner end of the spare shuttle 21 and until said spare shuttle 21 is permitted to drop in a proper manner into the place of the shuttle 20 and with the tip end 31 slightly preceding in movement the tip end 30. The members 27, 32 are so spaced as normally to prevent the rear end of the shuttle from sliding off the slanting part 27'. The upper shuttle 21 is supported during inaction by the lowermost shuttle 20, and during the transfer action by the top of the outgoing shuttle 20, and immediately thereafter by the picker 37 which is of the same height as the shuttle, so that the forward end of the supported shuttle cannot descend below its guides at either end until after the picker has partially recovered. When the said shuttle 21 dips down at its forward end and when the picker 37 has fully recovered, the rear end of the said shuttle slides down onto the bottom 23 of the battery box ready for the next transfer.

I have represented at 38 in Fig. 19 a typical shuttle preferably employed by me with the loom of my invention, and having therein a cavity extending substantially the entire length of the shuttle and containing no skewer. The filling package 39, preferably employed by me, is wound in any suitable manner, but preferably in the form of nested cones. As diagrammatically indicated in Fig. 19, the said filling package 39 closely fits throughout its entire length the cavity of the shuttle and the yarn or filling is withdrawn in the weaving operation from the inside of the package as indicated at 40. The filling is preferably of a coarse character, such as jute, and the package is usually forced with considerable pressure into the cavity of the shuttle so that it fits tightly and with very considerable friction therein. Thus, as the filling is withdrawn from the shuttle, the constantly diminishing portion of the package is firmly and frictionally held therein down to and past the time when and at the point at which the feeler indicates replenishment. The shuttle is provided with a horizontal slot 41 for the entry of the feeler.

The filling package feeler is most clearly shown in Figs. 6 to 11 inclusive. Therein I have represented the shuttle at 38 as positioned in the shuttle box having a front wall 42 and a back wall 43, the latter having an opening for the binder 44 functioning in the usual manner.

The bracket 22 shown most clearly in Figs. 16 and 17, has bolted and adjustably secured to the under side thereof the feeler bracket 45, as shown most clearly in Figs. 8 and 9. Said bracket 45 has an upstanding portion 46, to which is secured the feeler casing 47, which in cross section is of the general form shown in Fig. 11. It has opposite spaced side walls 48 and 49, connected by a top portion 50. In said side walls 48 and 49 are longitudinal grooves 51 and 52, wherein is slidingly positioned the outer or shuttle feeling member or slide 53 of the feeler. The said slide 53 is normally inwardly pressed by two coil springs 54 attached thereto and also to the feeler casing 50. When the shuttle is in its box at the replenishing side of the loom, said shuttle feeler slide 53 contacts therewith as indicated most clearly in Fig. 9. The said shuttle feeler slide 53 is upwardly notched as indicated at 55 in Fig. 9, so that when said slide 53 is positioned as shown in Figs. 9 and 10, a pawl-like member 56 is permitted to enter the same, being inwardly pressed by spring 57. Said pawl-like member 56 is pivoted at 58 upon an arm 59, fast upon a short shaft 60, so that when the member 56 is permitted fully to enter the notch 55, the shaft 60 receives a movement of partial rotation. The arm 59 has rigid therewith the depending wing-like portions 61, having adjustable screws 62, serving accurately to position the arm 59 upon the shaft 60, said arm being removable therefrom but secured thereto by a set screw 63.

The shuttle feeler slide 53 has opposite longitudinal grooves or ways 64 therein, receiving the filling feeler 65, which is of generally plate-like form, and is herein shown as having an uptured outer end 66, to which is connected a coiled spring 67, the inner end of which is connected by pin 68 to the shuttle feeler slide 53, so that said filling feeler is constantly inwardly pressed by said spring 67, and feels for the receding edge 69 of the package. At or near its outer end the said slide 65 has an opening 70' therein, which when the slide 65 moves inward past the receding edge of the package, registers substantially with the notch 55 in the shuttle feeler slide 53, thus permitting the arm 56 to move from the position indicated in Fig. 9 to the indicating or functioning position shown in Fig. 10, whereby through the connections hereinafter described the replenishment is effected.

As previously stated, the filling feeler slide 65 constantly feels for the receding edge 69 of the package. It is not until the filling has become substantially exhausted that the said slide 65 enters the shuttle or at least to more than a very limited extent. On the contrary, the said feeler slide 65 merely contacts with the outer surface of the package, which is of the full diameter, and it is not until sufficient yarn or filling has been drawn from the interior of the package that the receding edge 69 passes beyond the slide 65 so as to permit the latter to move in. The feeler slide 65 is, as stated, inwardly spring pressed and hence the said feeler will move inwardly and will function when the force of the spring 67 overcomes the resistance afforded by the filling. It is therefore evident that the feeler slide 65 may force its way inward through a coil or two of the receding edge and before the receding edge has wholly passed such slide, this depending upon the strength or adjustment of the spring 67.

Any suitable means may be provided to effect return movement of the feeler slide 65 into the feeler slide casing 47 and the outer slide 53. Herein for that purpose I have represented the said slide 65 as having its outer end beveled as indicated at 65' in Fig. 6, so that such beveled end may be engaged by the similarly beveled end 65'' of the slot 41 of the shuttle on the outward movement of the latter. The said slide 65 is then locked by the pawl like member 56 which has now returned to its former position.

Preferably I provide means whereby the operator is warned before replenishment occurs, since the shuttles are picked across the loom with great rapidity and force. For this purpose I have mounted upon or adjacent to the feeler casing 47, a bell 70, against which strikes a clapper 71, supported upon a spring arm 72, secured to a bracket 73, below or adjacent to the shaft 60. The said spring arm 72 is adapted to be flexed by one of the lugs or pins 74, upon the outer end of the shaft 60, and when said spring arm 72 is released the bell is struck.

Any suitable means may be provided to effect replenishment upon the indicating movement of the filling package feeler. I shall describe in detail that form of means and those connections constituting one embodiment of my invention, without, however, limiting myself thereto.

The shaft 60, as shown most clearly in Fig. 2ª, has fast to the outer end thereof an arm 75, which in turn is fast with a vertically positioned rod 76, as shown most clearly in Fig. 13, and which, at its lower end, enters the cycle box indicated generally at 77. The said box 77 is secured to the front girt of the loom, and comprises the outer cover-like metallic member 78, and the inner casting 79, having a bearing wherein is supported a stud shaft 80, receiving thereon for step-by-step rotary movement a cam 81, having formed therewith or secured thereto a ratchet 82, having teeth 83, one of which, as shown most clearly in Fig. 13, is more widely spaced than the others, said cam and ratchet having a hand knob 83' for turning the same. With the teeth of the said ratchet 82 is adapted to engage the end 84 of a pawl 85, which is pivotally connected at 86 to an arm 87, fast upon the rocker shaft 6 of the loom. During the normal operation of the loom, the end 84 of the pawl 85 merely slides back and forth along the elongated portion 88 of the ratchet without effecting any turning movement thereof. When, however, the filling package feeler functions, the rod 76 is moved axially upward, and through the connections, of which one form is shown, the ratchet 82 receives a slight turning movement sufficient to bring it into such position that the pawl 85 may now turn the same.

For the purpose I have herein represented the axially movable rod 76 as having its lower end connected at 89 to the arm 90 of a lever pivoted at 91 in the wall of the cycle box and having an outer weighted arm 92. The inner end of the arm 90 is provided with a head 93 that takes under and supports a pawl-like slide or arm 94, herein shown as formed in two parts, and pivoted at 95 to the arm 87. When the rod 76 is moved axially upward by the indicating movement of the filling package feeler, the slide 94 is lifted through the agency of the lever arm 90, so that said slide 94, which normally is below the teeth of the ratchet 82, is lifted into line with the lowermost of said teeth and in the next movement of said slide 94 to the left viewing Fig. 13, the ratchet 82 is thereby turned slightly in a clockwise direction viewing Fig. 13, so as to bring a tooth of the ratchet within the range of movement of the pawl 85. The said ratchet 82 is then sufficiently turned to cause the high part 96 of the cam 81 to engage a lug or projection 97 upon a lever arm 98, which is pivoted upon a shaft 98' in the cycle box and at its lower end is pivotally connected at 99 to a bracket or sleeve-like member 100, fast upon a slide rod 101. The upper end of hand lever 98 has attached thereto a coil spring 102 that is connected at its other end to a holding pawl 103 for the ratchet 82. The holding pawl 103 is pivoted at 104 and at the same point is pivoted a brake-lever 105, adapted to engage the brake disk 106 fast upon the said stud shaft 80, thereby preventing overmovement of said shaft. The lower end of the brake lever 105 is connected by a coil spring 106, to the end of the sliding rod 101.

From the foregoing description it will be evident that through the described connections, the rod 101 will be moved axially upon indicating or functioning movement of the filling package feeler. The said rod 101 is operatively connected with picking means, whereby the exhausted or substantially exhausted shuttle will be picked across the loom into the discharge receptacle, and whereby the spare shuttle will be picked across the loom into the shuttle box.

It is of course evident that many features of my invention, as for example the connections for effecting replenishment, may be employed, whatever be the character of the article that is supplied by the replenishing action, that is whether it be a shuttle or a filling package.

The axially movable rod 101 shown also in Figs. 20, 26 and 27, has fixedly secured near its opposite end a sleeve or bracket 107, which is pivotally connected with an arm 108, fast upon a vertically positioned rock shaft 109, shown most clearly in Fig. 20, as mounted in suitable bearings 110, 111 in upper and lower brackets 112, 113, secured to the side of the loom. Fast upon the said shaft 109 and near the upper end thereof, is a second arm 114, having a cam roll 115, rotatably mounted thereon. In order to prevent over-movement of the arm 114 it is provided with a roll or projection 114' to take against the hub of the picker cam hereinafter referred to. When the filling package feeler functions, the rod 101 is moved to the left from its normal position shown in Fig. 26 into the position shown in Fig. 27, thereby bringing the cam roll 115 into the path of movement of a certain cam whereby other parts to be described are moved and the picking is effected.

The cam shaft 14 has thereon the usual picker cams, one of which is indicated at 116 in Figs. 20, 21 and 22. Said picker cam 116 is provided with means whereby when the filling package feeler functions, the regular picker arm and the supplemental picker arm are specially moved so as to effect the throwing out of the substantially exhausted shuttle and the throwing in of the spare shuttle. For this purpose, I have provided the following mechanism.

Upon the illustrated picker cam 116 is pivotally mounted upon a stud 117, a member 118 having an irregular cam surface 119, and outer cam surfaces 120, 121, said latter surfaces being adapted to be brought respectively into the path of movement of the regular picker roll 122, and the supplemental picker roll 123 respectively, as shown most clearly in Fig. 22. In order to prevent over-movement the member 118 is provided with a lug 123' adapted to take between shoulders 123" upon the periphery of the picker cam 116.

The roll 115 upon the lever arm 114 when moved into the functioning position shown in Fig. 27 is adapted to enter beneath the cam surface 119 and thereby to elevate the member 118 from the position shown in Fig. 21 to that shown in Fig. 22, and thereby to cause said cam surfaces 120, 121 to act upon the picker rolls 122, 123. Preferably I provide means to lock said member 118 in its outer or elevated position, and for the purpose, as herein represented, I have pivoted upon the stud 124, located upon the picker roll 116, a bell crank lever constituting a lock, the arm 125 of which has connected thereto a coil spring 126 that is connected to the picker roll at 127, thereby tending constantly to move the lever into locking position. The other arm 128 of said lever has a locking portion 129, which takes under the member 118 when in its outer or elevated position and locks the same. The unlocking of said lock is effected by the continued motion of the roll 115, which engages the cam surface 130 of said bell crank lever and restores the same to the position shown in Fig. 21. During the normal weaving operation the regular picker roll 122 is constantly acted upon by the picker cam 116, but the supplemental picker roll 123 is out of the plane of said picker roll 116, and is not acted upon thereby.

Upon a shaft 131, shown most clearly in Figs. 20, 26 and 27, are loosely mounted the regular picker arm 132, which effects the picking of the running shuttle and the ejection of the substantially exhausted running shuttle from the loom, and the supplemental picker arm 133, which controls the picking of the spare shuttle from its box across the loom into the shuttle box at the opposite side of the loom. The regular picker arm 132 is provided with the pick roll 122 and the supplemental picker arm is provided with the pick roll 123. Thus the regular and supplemental picker arms 132 and 133 are caused to be moved to effect the replenishing operation and it will be evident from the illustrated construction that the timing of parts is such that the substantially exhausted shuttle is picked from its box into the exhaust receptacle very slightly after the picking of the spare shuttle from the spare receptacle into the opposite shuttle box of the loom. Viewing Fig. 2, it is evident that the paths of the substantially exhausted running shuttle while being ejected, and of the spare shuttle in being thrown into action, cross each other. Hence it is of the highest importance that the timing be such that the two shuttles do not touch each other. In practice the spare shuttle precedes the flight of the discarded shuttle by a small fraction of a second, and both shuttles are in flight at the same time.

The regular picker stick 134, most clearly shown in Fig. 3, is acted upon in the regular manner during the normal operation of the loom, but receives the described special movement to effect the ejection of the spent shuttle. The supplemental picker stick is represented at 36 in Figs. 1 3 and elsewhere. It is pivoted at its lower end at 136 to a link 137, itself pivoted at 138 upon the framing of the loom, and a coiled spring 138' connects said picker stick and a bracket upon the loom frame. At about mid-height said supplemental picker stick 36 has secured thereto a bracket 139, to which is pivoted at 140 a supporting link 141, the upper end of which is pivoted at 142 to the bracket of the spare shuttle support. The construction is such that said supplemental picker stick 36 is moved at the indicated time to throw the lowermost spare shuttle from its support across the loom into the shuttle box at the opposite side.

The loom is provided with a take-up which may be of any suitable construction and preferably I provide means to suspend the operation of said take-up during replenishment. While for this purpose any suitable means may be provided, I have herein represented the following mechanism.

Referring to Figs. 3, 4 and 5, the take-up roll is indicated at 143 and the cloth roll at 144. Said take-up roll 143 is provided with a ratchet formation 145, with the teeth whereof engages a pawl 146, pivoted at 147 upon a lever 148, loosely mounted at 149, axially of the take-up roll, and having adjustably connected to its outer end at 150 a link or rod 151, which as shown in Fig. 5 is pivotally connected at its opposite end at 152 to a bracket 153 upon the lay sword. Thus in the normal operation of the loom, the take-up roll receives a regular step-by-step movement and preferably a holding pawl 154 is pivoted at 154' to prevent retrograde movement of the take-up roll.

At 155 upon the frame I pivot a lever 155' having thereon a pin 155'', which is adapted to engage and to throw out of action at suitable times the holding pawl 154. The said lever 155' is provided with a depending arm 155''' having a stop or projection 155'''' adapted to be engaged by the weaver's foot and swung in a clockwise direction, viewing Fig. 4, thereby lifting the pawl 154 out of engagement with the teeth of the ratchet wheel 145. A spring 155''''' is preferably employed to return said lever 155' to inactive position.

In order to suspend the action of the take-up roll during the replenishing operation, I have herein represented the shaft 98' as having secured thereto a downwardly extending arm 156, shown in dotted line on Fig. 13 and which at its lower end is pivotally connected to a rod 157, which at its outer end is pivotally connected at 158 to a lever arm 159, which is adjustably connected at 160, 161 to the main lever arm 162, fast upon a rock shaft 163, which also has secured thereto an inwardly extending and preferably adjustable arm 164, which extends into the path of movement of a depending arm 165, fast with the pawl 146. The construction and arrangement of parts are such that when replenishment is indicated the lever arm 164 is lifted when the upper end of the lever 148 moves rearward or in a contraclockwise direction viewing Fig. 4, the arm 165 of the pawl 146 strikes against said arm 164 and thus the pawl 146 is lifted so as to suspend the take-up action until said pawl 146 is permitted to drop.

Preferably I provide means whereby the take-up pawl 146 may manually be thrown out of operation to permit the turning back of the take-up roll for any purpose. For that purpose I have herein represented the pawl 146 as having thereon a projection 166 and upon the holding pawl 154 is pivoted at 167 a pawl-like member or dog 168, which when turned into upright position rides under the projection 166 and thus lifts and holds the pawl 146 from engagement with the teeth of the ratchet 145.

The lay of the loom is provided with a suitable latch, not herein shown, for the purpose for holding the daggers up out of operative position whenever desired. Such latch and the described pawl-like member or dog 168 are provided, so that the loom may, when desired, be turned over by hand; that is to say, by throwing into action such latch, the shuttle may be removed, thus stopping the weaving and by throwing in the dog, the take-up is stopped. The cloth can thus be held stationary under its normal tension and the loom turned freely forward or backward for any emergency.

Any suitable means may be provided to receive the spent shuttle when it is picked across the loom as a part of the replenishing action. Preferably for the purpose I provide a receptacle which is carried by the lay of the loom at the side thereof opposite the spare shuttle support 19.

Herein and as most clearly shown in Figs. 1 and 28 to 33 inclusive, I have represented the lay as having secured to the front thereof at or near the end opposite the spare shuttle receptacle 19, a plurality of metal straps 169, preferably of the form shown in Figs. 30 and 31 and having secured to the down-turned ends 170 thereof a preferably wooden strip 171. Suitably spaced laterally from the wooden strip 171 is a curved or inclined strip 172 shown most clearly in plan in Fig. 28 and against which the spent shuttle tip strikes in the ejecting action. The said strip 172 has a bolt 173, which is adapted to be adjustably secured in a slot 174, whereby the said strip 172 may be positioned at the proper angle to receive the impact of the shuttle. Jointed to the inner end of the strip 172 by means of a pivot pin 175 is another strip 176, the other end of which is adjustably secured in position by means of a bolt 176' entering the slot 177 in one of the strips 169. The said strip 176 is positioned in general parallelism to the strip 171, and is spaced sufficiently therefrom to receive between them the spent or discarded shuttle 178.

Any suitable means may be provided against which the tip of the ejected shuttle 178 eventually strikes. For the purpose I have provided a bunter indicated in general at 179, and which is carried by an arm 180 upon the end of the lay. The bunter 179 is positioned between the strips 171 and 176 and so that its path of movement is suitably above a plate 181 fixed to the frame of the loom. The bunter 179 is preferably formed as a hollow member secured by bolts 182 to the arm 180 and having in its front wall a piston 183 in the recessed face of which is set a block of leather 184 or other suitable material to receive the impact of the shuttle. The piston is provided with a stem 185 which extends through a suitable opening 186 in the rear wall of the bunter 179. I may provide any suitable means for permitting a yielding but resisted movement of the piston. For the purpose I have represented the bunter as partially filled with small pieces 187, which are preferably metallic and may for example be rattling castings or shot, which become displaced and are forced upward by the piston movement due to the impact of the shuttle, and which force the piston outward again when the shuttle has been removed from between the said strips 171, 176. If desired, the return action of the piston may be supplemented by a coiled or other spring. The bunter 179 is provided with a screw cap 188 for permitting the insertion of the pieces 187.

Preferably I provide means for removing the ejected shuttle from its position between the strips 171 and 176 into a box or receptacle from which it may be manually removed. For that purpose I have represented the framing of the loom as having secured thereto a casting 189, to which is secured by metal straps 190 or otherwise, a box or receptacle 191.

The shuttle is discharged from the regular shuttle box at the right hand side of the lay viewing Fig. 2 while the lay is moving forward and while the shed is closing.

While the lay is finishing its forward stroke, and beginning its backward stroke at the point where the shed is practically closed, the shuttle that is being discarded rides upon the warps constituting the upper shade of the shed, and therefore passes somewhat diagonally or at a forward slant across the lay, and therefore in front of the regular shuttle box at the left hand side of the lay and into the receiver formed by or including the spaced strips 171, 176. The shuttle then momentarily rests upon the stationary plate 181, but in the continuous backward movement of the shuttle is wiped off the plate 181, drops to the shelf below and is pushed forward by the returning lay into the box 191 from which it may be removed by hand. The spare shuttle at the same time is picked across the loom above the closing shed slightly in front of the ejected shuttle and at a faster speed.

The ingoing or spare shuttle must have speed enough to box, that is to force the binder open, and preferably it is thrown across the loom at shuttle speed. The ejected shuttle is, however, thrown as easily and at as low a speed as practicable, thereby lessening the difficulty of stopping. In order to free the outgoing or ejected shuttle from the lay boxes, I preferably utilize the retarding action of the lay followed by the reverse movement thereof. The outgoing or ejected shuttle is shot or picked straight for its opposite box by the regular picker stick, and if the lay were stationary, or if it were not moving at a uniform speed, it would box in the customary manner on the last half of the lay stroke. In accordance with my invention, however, the change of shuttle is made on the forward part of the lay stroke.

In the regular picking of an ordinary loom the shuttle is normally held against the reed by the retardation of the lay followed by its reverse acceleration. Both of these forces act in the same direction, namely, backward, to hold the flying shuttle against the reed. Thus, on the forward half of the lay movement in the disclosed embodiment of my invention, the reed presenting no obstruction, the shuttle is in effect swerved forward after leaving its box, thus missing the opposite box and entering the spent shuttle receptacle, certain forms of which are herein shown.

Actually the lay is swerved by the retardation thereof, but the effect of such movement of the lay is to deflect the shuttle as stated, so that it does not enter its regular box, but is received in the spent shuttle receptacle. The shuttle transfer action is such in the disclosed embodiment of the invention, that the weft is omitted for one pick during the time of replenishment. Thus, on two shade goods the original shed in which the detection was made will again open to receive the first pick from the replenished weft. Furthermore the take-up stop mechanism and the operative connections between the feeler and the replenishment mechanism and between the feeler and take-up stop mechanism are such that on two shade goods, the said original shed in which the detection was made will open and the take-up will be caused to suspend its operation for the two picks more or less.

The loom is provided with a dagger indicated at 220 in Figs. 2 and 3, and which acts to stop the loom in the event that the shuttle binder 44 is not moved inward, thus indicating that the shuttle has not been properly boxed. Preferably I provide means whereby said dagger may be rendered temporarily inoperative. For this purpose I have herein represented a slide 221, having a handle 222 and which is mounted in suitable guides 223 upon the back of the shuttle box and may be moved in front of the dagger in such way as to hold it temporarily out of action, a projection on the slide coöperating with the dagger.

In Figs. 34, 35 and 36, I have represented still another form of spent shuttle receptacle and one which in many cases I preferably employ. Therein the lay 4 has bolted thereto a casting or mouth 229 which is preferably metallic. Secured to the upper transfer portion of said casting or mouth 229 by bolts 230 is a flexible member 231 which is preferably a leather belt or strap. The said strap is bent into general loop form as indicated most clearly in Fig. 35, and its opposite end is secured by bolts 232 to the lower transverse portion of said casting or mouth 229. Suitably spaced from the casting or mouth 229 by more than the length of the shuttle is a support 233 preferably in the form of a metal bracket, which is not a complete rectangle, but has an upwardly extending rear member or top transverse member and a downwardly extending end 234 terminating a considerable distance above the bottom of the bracket or mouth 229. The said belt or strap 231 is provided with slots 235 to receive bolts 236 whereby the belt or strap is secured to the said support 233. To the downwardly extending end 234 of the support 233 and to the outer downwardly extending portion of the casting or mouth 229 is secured a longitudinally extending strip 237 which is preferably of wood and is cut away intermediate its ends as represented at 238. The said strip 237 forms the front of the receiver chamber for the spare shuttle, but it extends only approximately half way down the same or about to the level of the warp, thus furnishing an opening at the bottom for the shuttle to be pushed through by the action of the lay and at the top forming the front of the chamber.

Laterally beyond the lower portion 239 of the belt or strap 231, is a shelf 240 of wood or other suitable material which is made as wide as the left hand picker stick action and the other lay parts will permit and upon which the said lower portion 239 of the belt or strap 231 rests and slides. The said shelf 240 leads to an open or skeleton receptacle 241 having upright front members 242 and into which the shuttle is pushed by the action of the lay. The said receptacle 241 is secured to the frame of the loom and preferably I also provide a block 242 secured by bolt 243 to the frame of the loom and constituting a guide for the adjacent tip of the spent shuttle.

At or near the point where the belt or strap 231 is bent upon itself, I secure an extra piece to take the wear of the shuttle. Such piece is represented at 244 in Fig. 35, and is secured by bolts 245 to the under side of the belt at such point. It is secured just beyond the support 233, and is loose at its bottom edge to assist in cushioning the spent shuttles. The said reinforcing strip 244 is secured at such point that the top portion of the belt or strap 231 will sag slightly before drawing the bolted reinforce 244 up against the support 233.

When the exhausted shuttle is picked across the loom in the replenishing action, it enters the mouth of the receiver and flying through the air for a little more than its length, strikes the reinforced curved portion of the belt or strap 231 forming the outer end of the chamber, taking up the slack and being stopped as described. The belt or strap 231 is normally slack and becomes taut with the impact of the shuttle, but it cannot recover sufficiently quick to cause rebound of the shuttle. The movement of the lay effects the ejection of the shuttle from the receiver across the shelf 240 into the receiver 241 where it is caught.

It is of great importance in a feeler loom that means be provided to stop the shuttle at the proper point and to prevent rebound thereof, since otherwise the feeler cannot enter the slot of the shuttle. This result, I preferably accomplish by providing if desired for a very slight vertical play of the shuttle in the box, this being effected by allowing the shuttle to impinge upon the slanting picker in such a manner that the point of the shuttle is deflected upward. The shuttle striking the top of the box is stopped. If I permit such vertical movement, it is of very limited extent, so as not to interfere with the feeler entering the slot in the shuttle.

As most clearly shown in Fig. 16, the filling is so placed in the spare shuttles that the loose ends thereof protrude as indicated at 254, 255. These protruding ends depend from the spare shuttles as supported and as each spare shuttle is picked across the loom above the shed, the protruding end, which is preferably two feet in length more or less, trails above the warp threads. When the said newly inserted shuttle is again shot across the loom,—that is, when it first passes through the shed,—the trailing end is caught in the closing shed, as indicated most clearly at 256 in Fig. 37.

In Fig. 38, I have indicated the trailing end 254 as overlying the shed, and in Fig. 39, I have indicated the same trailing end at 254 as caught within the closing shed.

So far as I am aware, I am the first to operate a loom in accordance with this method, namely, that involving the step of catching the trailing end of the replenishing shuttle within the closing shed, such step being preferably preceded by the step of passing the replenishing shuttle over the warp threads of the shed, and shall claim the same broadly.

I have heretofore referred to the matching of picks which may be readily effected by my invention in a loom of the type herein disclosed. In a complicated case of pick matching, as, for example, on a five shade weave, if, for example, the shuttle were held in its box for four picks, so that the original shed, which may be called shed No. 5, would again open free, so that the thread in the shed is free, it will be observed that in such case the number of picks suspended is one less than the "shade" of the weave. In such case, therefore, the fifth pick lays the thread in question, and the remaining four picks are withheld and the shed opens again on the next fifth pick to the original thread. In a loom operating preferably as that herein disclosed,—that is, a loom having a two shade weave,—the number of picks to be suspended is two less one; that is, a single pick. Thus, in throwing the replenishing shuttle over the warp, I effectually omit such pick from the weave, and therefore I effect the proper matching of the pick on the two shade weave referred to.

In weaving, I occasionally put two picks into the same shed, but the result is far less noticeable than where a pick or a part of a pick is lacking, for the effect in the latter case is to show up as a "stripe" plainly to be seen, whereas the occasional two picks in the same shed are scarcely noticeable.

The suspension of the take-up coöperates in the pick finding process, in that it holds the cloth stationary, while the picking is suspended, and the next pick is laid while the cams are passing through their full cycle of shed openings. If there were no suspension of the take-up, a stripe would appear in the weave.

I have referred to the relative swerving of the discharge shuttle with respect to the lay. In reality the shuttle travels in a right line, but with reference to the lay, whose back and forth motion the shuttle partakes of in its regular weaving picks, and from one end of which it starts on its discharge through the shuttle, it may be said in effect to swerve. Within the scope of my invention, I may start the outgoing shuttle from its box exactly on the forward center, in which case there would, technically speaking, be neither a retardation nor a reversal of the movement of the lay, but the resulting reverse acceleration would alone pull the lay away from the path of the shuttle sufficiently to cause the shuttle to miss its box.

Having thus described one illustrative embodiment of my invention, I desire it to be understood that although specific terms are employed, they are used in a generic and descriptive sense and not for purposes of limitation, the scope of the invention being set forth in the following claims:

1. A weft replenishing loom having means to pick the running shuttle and to discharge the spent shuttle by moving it across the loom and supplemental means to introduce a new shuttle by moving it across the loom into the box at the opposite side.

2. A weft replenishing loom having means to discharge the spent shuttle by picking it across the loom and means to introduce a new shuttle by picking it across the loom outside the shed into the box at the opposite side.

3. A weft replenishing loom having means to discharge the spent shuttle by picking it across the loom above the shed and means to introduce a new shuttle by picking it from the same side of the loom from which the spent shuttle is picked, into the box at the opposite side of the loom.

4. A weft replenishing loom having a support for a spare shuttle, a supplemental picker therefor, means to operate said picker to pick said spare shuttle across the loom in the replenishing operation, and means to pick the spent shuttle from its shuttle box across the loom.

5. A weft replenishing loom having a stationary support for a spare shuttle, a supplemental picker therefor, means to operate said picker to pick the spare shuttle across the loom outside the shed, means to pick the spent shuttle from its box across the loom, and a receiver for the discharged spent shuttle.

6. A weft replenishing loom having means to support a spare shuttle, substantially horizontal but at an incline to the face of the reed when in vertical position, a supplemental picker for the spare shuttle, and means to pick the spent shuttle across the loom outside the shed in the replenishing operation.

7. A weft replenishing loom having means to support a spare shuttle, substantially horizontal but at an incline to the face of the reed when in vertical position, a supplemental picker for the spare shuttle, means to pick the spent shuttle across the loom outside the shed in the replenishing operation, and a receiver for the discharged spent shuttle.

8. A weft replenishing loom having means to feel for the filling in the shuttle, and means functioning upon substantial exhaustion of said filling to pick across the loom the shuttle containing such substantially exhausted filling, and upon the same movement of the lay to pick across the loom a spare shuttle toward the box opposite that where the feeling indication occurred.

9. A weft replenishing loom having means mounted externally of the shuttle to feel for the filling in the running shuttle, means functioning upon substantial exhaustion of said filling to pick across the loom and to discharge therefrom the shuttle containing such substantially exhausted filling, a support for a spare shuttle at that side of the loom where the filling indication occurs and supplemental means to pick said spare shuttle across the loom upon filling indication.

10. A weft replenishing loom having means to support a spare shuttle at one side of the loom, means to pick said spare shuttle at an incline across the loom in the replenishing operation, and means to pick the spent shuttle at an incline across the loom and discharge it therefrom.

11. A weft replenishing loom having means to support a spare shuttle at one side thereof and means active upon replenishment indication to pick the spent shuttle and the spare shuttle in intersecting paths across the loom from the same side.

12. A weft replenishing loom having means to support a spare shuttle at one side thereof and means active upon replenishment indication to pick the spent shuttle across the loom and discharge the same and to pick the spare shuttle across the loom in an intersecting path thereto but in advance of said spent shuttle.

13. A weft replenishing loom having means to support a spare shuttle at one side thereof and means active upon replenishment indication to pick both the spare and the spent shuttles across the loom in intersecting paths with the spare shuttle slightly preceding the spent shuttle, but so that both shuttles are in flight at the same time.

14. A weft replenishing loom having a shuttle adapted to carry a coreless weft package, a feeler for the edge portion of said weft package, means to support said feeler for movement in a straight line both to feel for said edge and in its continued indicating movement, and means whereby said feeler is caused to function when it overcomes the resistance of said edge portion.

15. A feeler for a weft replenishing loom having one member to feel for the shuttle and another member to feel for the edge portion of the filling package within the shuttle in combination with means exterior to the filling package to hold said package in position until replenishment is indicated through the finding of said edge portion by the last mentioned member.

16. A weft replenishing loom having a feeler comprising two slidable members, one to feel for the shuttle and the other to feel for the filling package in the shuttle, means wholly external to said package to support it in position in the shuttle throughout the entire period of the feeling action, and means to support said members for sliding movement.

17. A weft replenishing loom having a feeler provided with an outer member to feel for the shuttle and an inner member carried thereby to feel for the filling package in the shuttle in combination with means wholly external to said package to support it in position in the shuttle throughout the entire period of its feeling action.

18. A weft replenishing loom having a shuttle adapted to carry a coreless weft package, a feeler having a member to feel for said shuttle and another member to feel for the edge portion of said coreless weft package and means wholly external to said package to support it in position in the shuttle throughout the entire period of the feeling action.

19. A weft replenishing loom having a shuttle adapted to carry a coreless weft package and a feeler comprising two members, one of which is adapted to feel for the shuttle and the other of which is adapted to feel for the edge portion of the coreless weft package and to function when it moves past the same.

20. A weft replenishing loom having a shuttle adapted to carry a coreless weft package and a feeler for the edge portion of said weft package, said feeler having a sliding movement in a right line, and adapted to function when it moves past said edge.

21. A feeler for a weft replenishing loom having a casing, a member mounted and movable therein to feel for the wall of the shuttle and a member mounted and movable within said first member to feel for the filling package in said shuttle and means wholly external to said package to support it in position in the shuttle throughout the entire period of the feeling action.

22. A feeler for a weft replenishing loom having a casing, a member mounted and movable therein to feel for the wall of a shuttle carrying a coreless weft package, and a member mounted and movable within said first member, to feel for the edge of said coreless weft package.

23. A weft replenishing loom having a shuttle adapted to carry a coreless weft package, a feeler casing, a feeler member slidable in said casing, and adapted to feel for the wall of the shuttle, spring means tending normally to move said feeler member against said shuttle wall, and a feeler member slidable within said first feeler member and adapted to feel for the edge of said coreless weft package.

24. A weft replenishing loom having a shuttle adapted to carry a coreless weft package, a feeler casing, a feeler member slidable in said casing, and adapted to feel for the wall of the shuttle, spring means tending normally to move said feeler member against said shuttle wall, a feeler member slidable within said first feeler member and adapted to feel for the edge of said coreless weft package, and spring means tending to move said second feeler member against said coreless weft package.

25. A loom having means to introduce a new shuttle into the loom by picking it across said loom, and a co-acting signal to indicate impending picking of said shuttle in the replenishing operation already initiated.

26. A loom having means to introduce a new shuttle into the loom by picking it across said loom, and a co-acting audible signal to indicate impending picking of said shuttle in the replenishing operation already initiated.

27. A weft replenishing loom having a feeler composed of inner and outer members adapted to feel for the shuttle body and the filling therein, both of said members having openings and means adapted upon registry of said openings to effect replenishment.

28. A weft replenishing loom having a feeler composed of inner and outer members adapted to feel for the shuttle body and the filling therein, both of said members having openings, a spare shuttle support, means to discharge a shuttle from said support into the loom, and means to actuate said shuttle discharging means when said feeler member openings register.

29. A weft replenishing loom having a pick cam, a picker for the running shuttle, a picker for a spare shuttle and means co-operating with said pick cam to cause both of said pickers to be actuated and thereby to effect replenishment.

30. A weft replenishing loom having a pick cam, a picker for the running shuttle, a picker for a spare shuttle and means carried by said pick cam and functioning only upon indication for replenishment to cause both of said pickers to be actuated and thereby to discharge the spent shuttle and to introduce the spare shuttle.

31. A weft replenishing loom having a pick cam, a picker for the running shuttle, a picker for the spare shuttle, movable cam formations carried by said pick cam and adapted respectively to act upon said pickers, and means to move said cam formations into functioning position upon replenishment indication.

32. A weft replenishing loom having a pick cam, a picker for the running shuttle, a picker for the spare shuttle, a cam member pivoted upon said pick cam, a feeler for the filling in the shuttle, and intermediate operative connections between said feeler and said pivoted cam member to move said cam member into operative relation to and to actuate said pickers upon replenishment indication by said feeler.

33. A weft replenishing loom having a pick cam, a picker for the running shuttle, a picker for the spare shuttle, a movable cam member adapted to act upon said pickers, means active upon replenishment indication to move said movable cam member into functioning relation with said pickers, and locking means to hold said movable cam member in functioning relation to said pickers.

34. A weft replenishing loom having a pick cam, a picker for the running shuttle, a picker for the spare shuttle, and means carried by said pick cam to cause the running shuttle picker to discharge the same when spent and to cause the picker for the spare shuttle to function slightly before the commencement of the discharge flight of the spent shuttle.

35. A weft replenishing loom having a cycle controlling shaft, driving means for said shaft, means to feel for the weft, an axially movable substantially rigid member operatively connected to said weft feeling means and also to said driving means, means to move said axially movable member upon feeling indication and thereby to render said driving means active, shuttle replenishing mechanism, and means operatively associated therewith and with said cycle controlling shaft to place a replenishing shuttle in action by picking it across the loom.

36. A weft replenishing loom having a cycle controlling shaft, driving means for said shaft, means to feel for the weft, a rod operatively connected to said weft feeding means and to said shaft, means to lift said rod thereby to render said driving means active upon feeling indication, shuttle replenishing mechanism, and means operatively associated therewith and with said cycle controlling shaft to pick a replenishing shuttle across the loom from its supported position as a spare shuttle.

37. A weft replenishing loom having a cycle controlling shaft, driving means therefor, means to feel for the weft, operative connections between said weft feeling means and said driving means, a take-up, and operative connections between said cycle controlling shaft and said take-up, to control the latter.

38. A weft replenishing loom having a cycle controlling shaft, driving means therefor, means to feel for the weft, operative connections between said weft feeling means and said driving means, a take-up, and operative connections between said cycle controlling shaft and said take-up to suspend the latter upon replenishment indication of said weft feeling means.

39. A weft replenishing loom having a cycle controlling shaft, driving means therefor, including a ratchet, a rock shaft having pawl means to engage said ratchet, means to feel for the weft connections from said weft feeling means to render said pawl means active upon said ratchet, shuttle replenishing mechanism and means operatively associated therewith and with said cycle controlling shaft to propel a spare shuttle across the loom from its supported position as a spare shuttle, and thereby to introduce it into action as a running shuttle.

40. A weft replenishing loom having a cycle controlling shaft, driving means therefor, including a ratchet, a rock shaft having two pawls to engage said ratchet, means to feel for the weft, a rod connected with said weft feeling means and adapted to move one of said pawls into engagement with said ratchet and thereby to render the other pawl active upon said ratchet, picking mechanism and operative connections between said picking mechanism and said cycle controlling shaft.

41. A weft replenishing loom having a cycle controlling shaft, driving means therefor, including a ratchet, a rock shaft having two pawls to engage said ratchet, means to feel for the weft, a rod connected with said weft feeling means and adapted to lift one of said pawls into engagement with the ratchet thereby to effect turning movement thereof and thereupon to render the other pawl active upon the ratchet, auxiliary picking means and operative connections between the same and said cycle controlling shaft, thereby to pick the new shuttle into action.

42. A weft replenishing loom having a cycle controlling shaft, driving means therefor, means to feel for the weft, operative connections between said weft feeling means and said driving means, a pick cam, a picker for the running shuttle, a picker for the spare shuttle, means carried by said pick cam to act upon both of said pickers, and operative connections between said means carried by the pick cam and said cycle controlling shaft, and rendered active upon replenishment indication.

43. A weft replenishing loom having a cycle controlling shaft, driving means therefor, means to feel for the weft, operative connections between said weft feeling means and said driving means, a pick cam having a movable cam member, a picker for the running shuttle and a picker for the spare shuttle adapted to be acted upon by said cam member, and operative connections between said cam member and said cycle controlling shaft and rendered active upon replenishment indication.

44. A weft replenishing loom having a cycle controlling shaft, driving means therefor, means to feel for the weft, operative connections between said weft feeling means and said driving means, picking means for the running shuttle and for a spare shuttle, and means under control of said cycle controlling shaft to operate said picking means upon replenishment indication.

45. A weft replenishing loom having a cycle controlling shaft, driving means therefor, means to feel for the weft, operative connections between said weft feeling means and said driving means, picking means for the running shuttle and for a spare shuttle, and means under control of said cycle controlling shaft to operate said picking means upon replenishment indication and thereby to discharge the spent shuttle by picking it across the loom and to pick the spare shuttle across the loom into a shuttle box.

46. A weft replenishing loom having a cycle controlling shaft, driving means therefor, means to feel for the weft, operative connections between said weft feeling means and said driving means, and means operatively connected with said cycle controlling shaft to throw a spare shuttle across the loom and to eject the spent shuttle across the loom upon replenishment indication by said weft feeling means.

47. A weft replenishing loom having a cycle controlling shaft, driving means therefor, means to feel for the weft, operative connections between said weft feeling means and said driving means, a rod 101 controlled in movement by said cycle controlling shaft, a shaft 109 having lever arms 108, 114, operatively connected to said rod 101 and a pick cam 116 having a movable member 118 under the control of said lever arm 114, and picking means controlled by said movable member 118.

48. A weft replenishing loom having means to support a plurality of spare shuttles above and resting upon each other, and picking means acting in the direction of the longitudinal axis of the shuttle to discharge the lowermost shuttle and adapt it to support the next overlying shuttle during the discharge movement of said picking means.

49. A weft replenishing loom having means regularly to pick a shuttle across the loom, weft replenishing means, the lay, means to impart to and fro movement thereto including means to impart acceleration on the backward movement of the lay, and means operatively associated with said replenishing means and with the lay to effect the relative swerving of the outgoing shuttle across the loom with respect to the lay thereof in the replenishing operation on the finishing of the forward part of the lay stroke, so that the said outgoing shuttle will miss the opposite shuttle box due to said acceleration upon the ensuing backward movement.

50. A weft replenishing loom having means to pick a shuttle from its box, weft replenishing means, the lay, means to impart to and fro movement thereto including means to change the speed of the lay upon the backward part of its to and fro movement, and means operatively associated with the weft replenishing means and with the lay, whereby the change in speed of the lay upon said backward movement is utilized effectively to swerve or deflect the shuttle from its initial position with regard to the lay, possessed by it at the finishing of the forward part of the lay stroke, thereby causing it to miss entering the box aimed at.

51. A weft replenishing loom having means to discharge the spent shuttle by moving it across the loom, and a receptacle for the running-shuttle-surface of the lay and into which said spent shuttle is directly received at the end of its movement across the lay, said receptacle being in front of the shuttle box at that side of the loom where said receptacle is located.

52. A weft replenishing loom having means to discharge the spent shuttle by moving it across the loom outside the shed, and a receptacle for the running-shuttle-surface of the lay and into which said spent shuttle is directly received at the end of its movement across the loom outside the shed.

53. A weft replenishing loom having means to support a plurality of spare shuttles above and resting upon each other, and a supplemental picker to discharge the lowermost shuttle into the box at the opposite side of the lay.

54. A weft replenishing loom having means to support a plurality of spare shuttles above and resting upon each other, and picking means adapted to discharge the lowermost shuttle by movement in the direction of the longer axis of said shuttle and adapted to support the next overlying shuttle during the discharge movement of said picking means.

55. A weft replenishing loom having a support 19 for a plurality of spare shuttles, picking means adapted directly to engage the lowermost of said spare shuttles while in said support 19, said support having members 25, 26, and members 32, 27 carried thereby and adapted to receive the points of an overlying spare shuttle.

56. A weft replenishing loom having a support for a plurality of spare shuttles, and means to hold an overlying spare shuttle in said support, including a vertically slotted member 32 and a member 27 having a vertical slot 29 extending but part way therethrough.

57. A weft replenishing loom having means to support a plurality of spare shuttles each containing a coreless weft package, means exterior to each package to support it in position in its shuttle until replenishment affecting such shuttle, feeling means adapted to feel for the coreless filling package in the running shuttle, and means whereby upon successive replenishment indications said plurality of spare shuttles are brought one after another into the place of the running shuttle.

58. A weft replenishing loom having means to support a plurality of spare shuttles each containing a coreless weft package, feeling means adapted to feel for the edge of the coreless filling package in the running shuttle and to function upon movement past that edge, and means whereby upon successive replenishment indicating movements of said feeling means past the edge of the coreless filling package in successive shuttles, said plurality of shuttles are brought one after another into the place of the said running shuttle.

59. A weft replenishing loom having means to support a spare shuttle, weft replenishing indicating means, and means active upon weft replenishing indication to discharge the spent shuttle over the shed and to throw into action the spare shuttle over the shed into the opposite box.

60. A weft replenishing loom having means to support a spare shuttle, weft replenishing indicating means at the same side of the loom as said spare shuttle support, and means active upon weft replenishing indication to throw both the spent shuttle and the spare shuttle at an inclination across the loom over the shed.

61. A weft replenishing loom having means to support a spare shuttle, weft replenishing indicating means at the same side of the loom as said spare shuttle support, and means active upon weft replenishing indication to throw both the spent shuttle and the spare shuttle over the shed in paths that intersect.

62. A weft replenishing loom having means to support a spare shuttle, weft replenishing indicating means at the same side of the loom as said spare shuttle support, and means active upon weft replenishing indication to throw both the spent shuttle and the spare shuttle over the shed from the same side of the loom.

63. A weft replenishing loom having means at one side thereof to support a plurality of spare shuttles stationarily, horizontally, and at an inclination to the face of the reed, and means active upon replenishing indication to throw one of said shuttles directly from its stationary position across the loom.

64. A weft replenishing loom having a filling package feeler comprising a feeler casing 47 and feeler slides 53 and 65 mounted therein and adapted respectively to contact with the shuttle wall and the filling package within the shuttle, and means exterior to said filling package to hold it in position in the shuttle until replenishing indication occurs through movement of said feeler slides.

65. A weft replenishing loom having a filling package feeler comprising a feeler casing 47 and feeler slides 53 and 65 mounted therein, an operative connection between said shaft and both of said feeler slides and means exterior to said filling package to hold it in position in the shuttle until replenishing indication occurs through movement of said feeler slides.

66. A weft replenishing loom having a filling package feeler comprising a feeler casing 47 and feeler slides 53 and 65 mounted therein, a shaft 60 having a member 56 adapted to co-act with both of said feeler slides, and means exterior to said filling package to hold it in position in the shuttle until replenishing indication occurs through movement of said feeler slides, and means operatively connected with said shaft 60 to effect replenishment.

67. A weft replenishing loom having a filling package feeler comprising a feeler casing 47 with feeler slide 53 mounted therein, spring means 54 for said slide, a slide 65 within said casing and a spring 67 for the slide 65, a pawl-like member 56 co-acting directly with both of said slides, and means exterior to said filling package to hold it in position in the shuttle until replenishing indication occurs through movement of said feeler slides.

68. A weft replenishing loom comprising replenishing means, and picking means for the running shuttle including a pick cam having a member movable relatively to said pick cam, and operatively connected with said replenishing means.

69. A weft replenishing loom having shuttle replenishing means, and picking means for the running shuttle including a pick cam having a member movable relatively to said cam and operatively connected to said shuttle replenishing means.

70. A weft replenishing loom having means to discharge the spent shuttle by moving it across the loom, and means to introduce a new shuttle by moving it across the loom into a box at the opposite side, said means acting to move said two shuttles substantially simultaneously.

71. A weft replenishing loom having means to discharge the spent shuttle by moving it across the loom, and means to introduce a new shuttle by moving it across the loom into a box at the opposite side, said means acting to move said two shuttles upon the same movement of the lay.

72. A weft replenishing loom having means to discharge the spent shuttle by moving it across the loom, and means to introduce a new shuttle by moving it across the loom into a box at the opposite side, said means acting to move said two shuttles upon the same beat-up of the lay.

73. A weft replenishing loom having a running shuttle containing a coreless weft package wound in nested cones and from which the weft is withdrawn from the inside thereof, and a sliding feeler mounted outside the said shuttle and adapted to feel for the receding edge of said weft package.

74. A weft replenishing loom having a running shuttle containing a coreless weft package wound in nested cones and from which the weft is withdrawn from the inside thereof, a sliding feeler mounted outside the said shuttle and adapted to feel for the receding edge of said weft package, and means active upon sliding indicating movement of said feeler to throw a spare shuttle across the loom into a shuttle box.

75. A weft replenishing loom having means to support a plurality of shuttles each containing a coreless filling package, means successively to bring said shuttles with their coreless filling packages onto the level of the lay, and feeler means adapted to feel for the receding edge of the coreless filling package that is in the shuttle upon the level of the lay.

76. A weft replenishing loom having means to support a plurality of shuttles each containing a coreless filling package, means successively to bring said shuttles with their coreless filling packages onto the level of the lay, and a sliding feeler mounted independently of the shuttle and adapted to feel for the receding edge of the coreless filling package that is in the shuttle upon the level of the lay.

77. A weft replenishing loom having means to support a plurality of shuttles each containing a coreless filling package, means successively to bring said shuttles with their coreless filling packages onto the level of the lay, feeler means adapted to feel for the receding edge of the coreless filling package that is in the shuttle upon the level of the lay, and means co-acting with said feeler means to bring one of said plurality of shuttles into action upon indicating movement of said feeler means.

78. A weft replenishing loom having means to support a plurality of shuttles each containing a coreless filling package, means successively to bring said shuttles with their coreless filling packages onto the level of the lay, a sliding feeler mounted independently of the shuttle and adapted to feel for the receding edge of the coreless filling package that is in the shuttle upon the level of the lay, and means co-acting with said sliding feeler to bring one of said plurality of shuttles into action upon indicating movement of said feeler.

79. A weft replenishing loom provided with picking mechanism for the running shuttle including a pick cam having a member movable relative to said cam for effecting replenishing transfer and means operated by said member to introduce replenishing weft into action.

80. A weft replenishing loom having picking mechanism for the running shuttle including a pick cam provided with a member movable relative to said cam, means to move said member in effecting replenishing transfer and means operated by said member to introduce replenishing weft into action.

81. A weft replenishing loom having picking mechanism for the running shuttle including a pick cam, a supplemental cam secured thereto, means to throw up said supplemental cam at weft replenishing indication and means operated by said supplemental cam to introduce a replenishing weft carrier into action.

82. A weft replenishing loom having a pick cam provided with a movable and forwardly extending supplemental cam positioned in the same path as said pick cam, and means whereby said forwardly extending cam is moved into active position for weft replenishment, and a regular picker stick adapted to be acted upon by said forwardly extending cam to eject the shuttle from its regular box across the lay but to be swerved from its straight course and to miss entering the opposite box.

83. A weft replenishing loom having means to pick the running shuttle across the loom, and coöperating means active upon weft replenishment to pick the running shuttle across the loom in a path swerving from its regular course so as to miss the opposite box.

84. A weft replenishing loom having means to pick the running shuttle across the loom into the opposite box, and means active upon weft replenishment whereby the running shuttle is picked across the loom but relatively swerved from its course, and a receptacle distinct from the opposite shuttle box wherein said running shuttle is received.

85. A weft replenishing loom having means to pick the running shuttle across the loom, and means active upon weft replenishment on the forward part of the lay stroke to pick the running shuttle across the loom in a relatively swerving direction, and a receptacle distinct from the opposite shuttle box to receive said swerved, discarded shuttle.

86. A weft replenishing loom having means regularly to pick the shuttle across the loom, and means whereby upon weft replenishing the retardation and ensuing reverse movement of the lay are utilized to cause a relative swerving of the discharging shuttle with respect to the lay, so as to miss the opposite shuttle box.

87. A weft replenishing loom having means regularly to pick the shuttle across the loom, a receiver for the ejected running shuttle, and means whereby retardation and ensuing reverse movement of the lay are utilized to effect upon replenishment the relative swerving of the discharging shuttle with respect to the lay whereby said discharging shuttle enters the said receiver instead of the shuttle box.

88. A weft replenishing loom having a pick cam and a movable cam mounted thereon, weft replenishing means, and an operative connection between said weft replenishment means and said movable cam, whereby a supplemental picking impulse may be given to an ingoing spare shuttle.

89. A weft replenishing loom having means to discharge the spent shuttle by moving it across the loom, and means to introduce a new shuttle by moving it across the loom into a box at the opposite side, said two shuttles being in flight across the loom at the same time.

90. A weft replenishing loom having means to discharge the spent shuttle by picking it across the loom above the shed.

91. A weft replenishing loom having means to discharge the spent shuttle by picking it across the loom outside the shed.

92. A weft replenishing loom having means to discharge the spent shuttle by picking it across the loom above the shed, and means to introduce a new shuttle by picking it across the loom.

93. A weft replenishing loom having a filling feeler provided with a tongue adapted to enter the shuttle, and to feel for the receding edge of the filling package therein, a shuttle having a slot to receive said tongue, said tongue and slot having formations to effect the pushing back of the tongue in the movement of the shuttle.

94. A weft replenishing loom having a filling feeler provided with a tongue to enter the shuttle, but held by the filling from entering past the inner surface of the shuttle wall until indicating movement, and a shuttle having a slot to receive the tongue, said tongue and said slot being beveled to cause the shuttle to push back the tongue when passing out of its box.

95. A weft replenishing loom having a spare shuttle receiver and supports for the tips of the spare shuttle, one of said supports being open and the other being closed at its bottom.

96. A weft replenishing loom having a spare shuttle support provided with slotted guides to receive the opposite tip of the spare shuttle, one of said guides being opened at its bottom and the other being closed and provided with a shelf to permit the supported tip of the shuttle to slide off when the opposite end of the shuttle is released.

97. A weft replenishing loom having a spare shuttle support provided with slotted guides for the opposite tips of the shuttle, the forward guide being open at its bottom and the rear guide having a slanting shelf to close the same, said guides being spaced at such distance that the rear shuttle tip cannot pass on until the front tip is released.

98. A weft replenishing loom having a spare shuttle support provided with slotted guides for the opposite tips of the shuttle, the forward guide being open at its bottom and the rear guide having a slanting shelf to close the same, said guides being spaced at such distance that the rear shuttle tip cannot pass on until the front tip is released, and means whereby the uppermost shuttle is supported during inaction by an underlying spare shuttle and during transfer of the underlying shuttle by the latter and by the picker.

99. In a weft replenishing loom, a lay having means to swing the same including means to retard its speed during that part of the forward movement corresponding substantially to the passing of the frogs by the daggers and to reverse its direction of movement, weft replenishing means, and operative connections between the lay and said weft replenishing means acting through said change in speed of the lay at said part of the forward movement to effect such replenishment.

100. In a weft replenishing loom, a lay having means to swing the same including means to retard its speed during that part of the forward movement corresponding substantially to the passing of the frogs by the daggers and to reverse its direction of movement, weft replenishing means and operative connections thereto including means whereby said change in speed of the lay at said part of the forward movement is utilized in effecting weft replenishment, and means whereby the said retardation in speed of the loom and the reversal of the direction of movement thereof are utilized in effecting replenishment.

101. A weft replenishing loom having a spent shuttle receiver occupying a fixed position with respect to the normal position of the shuttle box, said receiver being provided with a receiver opening at its end and a discharge opening at its side, and a slack impact receiving member 231.

102. A weft-replenishing loom having means to pick the shuttle from its box, weft-replenishing means, the lay, means to impart to-and-fro movement thereto, including means to change the speed of the lay between the passing of the frogs by the daggers on the forward part of the lay stroke and the beginning of the picking action on the following back stroke, and means whereby the said change in speed and the change in direction of movement of the lay at the end of its forward stroke are utilized effectively to swerve or deflect the shuttle from the initial position with regard to the lay, thereby causing it to miss entering the box aimed at.

spent shuttle receiver provided with a front wall extending from the top thereof to the approximate level of the bottom of the entering shuttle, said receiver being open at its front below that point, thereby providing a shuttle discharge opening.

104. A weft replenishing loom having a spare shuttle receiver provided with a slack member, and means whereby the same becomes taut with the impact of the shuttle, said member recovering slowly, thereby preventing rebound.

105. A weft replenishing loom having a shuttle receiver attached to the lay thereof, and having a fixed relation with respect to the said lay, said receiver having a slack-impact receiving member and having an opening in its front side for the discharge of the shuttle, and a receptacle to catch the shuttle discharged through said opening.

106. A weft replenishing loom having transfer mechanism for effecting replenishment, and a feeler operatively connected thereto for indicating replenishment, and means coöperating therewith whereby one pick of weft is omitted from the shed during replenishment but is thrown across the loom outside the shed, so that on two shade goods the original shed in which the detection was made will again open to receive the first pick from the replenished weft.

107. A weft replenishing loom having a transfer mechanism, a feeler for indicating replenishment and operatively connected to said replenishing mechanism, a take up stop mechanism, and operative connections between the feeler and take-up stop mechanism, and coöperating means whereby one pick of new weft is omitted from the shed during the time of replenishment but is thrown across the loom outside the shed, and the original shade in which the detection was made will open to receive the first pick from the replenished weft.

108. A weft replenishing loom having a cycle controlling shaft, driving means for said shaft, means to feel for the weft, an axially movable member operatively connected to said weft feeling means and also to said driving means, means to move said axially movable member upon feeling indication and thereby to render said driving means active, and picking means controlled by said cycle controlling shaft.

109. A weft replenishing loom having a cycle controlling shaft, driving means for said shaft, means to feel for the weft, a rod operatively connected to said weft feeding means and to said shaft, means to move said rod thereby to render said driving means active upon feeling indication and picking means for a replenishing shuttle operatively connected to said rod.

110. A weft replenishing loom having means to support a plurality of spare shuttles above and resting on each other, and picking means adapted to discharge endwise the lowermost shuttle and also adapted to support the next overlying shuttle during the discharge movement of said picking means.

111. A weft replenishing loom having means to discharge the spent shuttle by picking it across the loom outside the shed, and means to introduce a new shuttle by picking it across the loom.

112. A weft replenishing loom having means to support a spare shuttle at one side thereof, and means active upon replenishment indication to pick the spent shuttle and the spare shuttle in intersecting paths across the loom from the same side with one of said shuttles slightly in advance of the other.

113. A weft replenishing loom having means regularly to pick the shuttle across the loom, weft replenishing means, the lay, means to impart to and fro movement thereto including an accelerating movement upon the backward movement of the lay up to the beginning of the picking action on such backward movement, and means operatively associated with said weft replenishing means and the lay to effect the relative swerving of the outgoing shuttle across the loom with respect to the lay thereof in the replenishing operation upon said defined part of the backward movement of the lay, so that the said outgoing shuttle will miss the opposite shuttle box.

114. A weft replenishing loom having means to pick the shuttle from its box, weft-replenishing means, the lay, means to impart to-and-fro movement thereto including means to change the speed thereof in the backward movement thereof up to the beginning of the picking action on such backward movement, and means operatively associated with the weft-replenishing means and the lay, whereby the changing speed of the lay on the defined part of the backward movement is utilized effectively to swerve or deflect the shuttle from the initial position with regard to the lay, thereby causing it to miss entering the box aimed at.

115. A weft replenishing loom having means to pick a shuttle from its box, weft replenishing means, the lay, means to impart to and fro movement thereto, and means operatively associated with the weft replenishing means and with the lay whereby the reversal of the direction of the lay at the limit of forward movement thereof is utilized effectively to swerve the said shuttle from its initial position with regard to the lay, thereby causing it to miss entering the box aimed at upon its picking action at the said reversal of direction of the lay.

116. A weft replenishing loom having weft-replenishing means including an exhausted shuttle receiving receptacle and having means to pick an exhausted shuttle from its regular box, the lay, means to impart to and fro motion thereto, and means coöperating with the weft replenishing means and with the lay whereby the ordinary changing speed of the lay and the reversal thereof at the end of the forward movement of the lay are utilized effectively to divert the said shuttle from its initial direction toward the opposite box to that of said receptacle.

117. A weft replenishing loom having weft replenishing means including an exhausted shuttle receiving receptacle and also having means to pick an exhausted shuttle from its regular box, the lay, means to impart to and fro motion thereto, and means coöperating with the weft replenishing means and with the lay whereby the ordinary changing speed of the lay or the reversal thereof at the finish of the forward movement thereof is utilized effectively to divert the said shuttle from its initial direction toward its opposite box to that of the said receptacle.

118. That process of entering replenishing weft into the shed, comprising picking a new weft container across the loom above all the weft threads while permitting an end of said weft to trail from said container and then passing said container in the opposite direction through the closing shed, whereby the trailing end is caught in said closed shed.

119. That method of inserting a new weft into the shed which comprises picking a weft container across the shed above all the weft threads thereof, and then picking said container in the opposite direction through the shed.

120. A weft replenishing loom having a cycle controlling shaft, driving means for said shaft, means to feel for the weft, an axially movable member operatively connected to said weft feeling means and also to said driving means, means to move said axially movable member upon feeling indication and thereby to render said driving means active and supplemental picking means operatively connected to said axially movable member to effect the introduction of a new weft supply at that side of the loom opposite to said weft feeling means.

121. A weft replenishing loom having means to support a plurality of spare shuttles above and resting upon each other, and picking means adapted to discharge the lowermost shuttle endwise and adapted to support the next overlying shuttle during the discharge movement of said picking means.

122. A weft replenishing loom having means to support a plurality of spare shuttles above and resting upon each other, and picker means to discharge the lowermost shuttle of said plurality of shuttles into the box at the opposite side of the lay.

123. A weft replenishing loom having means to support a plurality of spare shuttles each containing a coreless weft package, feeling means adapted to feel for the receding edge of the coreless filling package in the running shuttle, and means whereby upon successive replenishment indications said plurality of spare shuttles are brought one after another into the place of the running shuttle.

124. A weft replenishing loom having means to discharge the spent shuttle by moving it across the loom, and a receptacle for the running-shuttle-surface of the lay and into which said spent shuttle is directly received at the end of its movement across the loom, said receptacle being dissociated from the shuttle box at the same side of the loom whereby the spent shuttle enters said receptacle without necessary change of condition of said shuttle box.

125. A loom having means to support a spare shuttle at one side thereof, and means to pick the spent shuttle and the spare shuttle in intersecting paths across the loom from the same side.

126. A weft replenishing loom having a shuttle adapted to carry a weft package, means exterior to said package to hold it in position until replenishment occurs, a feeler casing, a feeler member slidable in said casing and adapted to feel for the wall of the shuttle, spring means tending normally to move said feeler member against said shuttle wall, and a feeler member slidable within said first feeler member and adapted to feel for said weft package.

127. A weft replenishing loom having means to support a plurality of spare shuttles above and resting upon each other, and picking means adapted directly to engage the lowermost of said shuttles and to discharge it in the direction of the longer axis of said shuttle, and adapted to support the next overlying shuttle during the discharge movement of said picking means.

128. A weft replenishing loom having means to support a plurality of spare shuttles, each containing a coreless weft package, feeling means adapted to feel for the receding edge of said coreless filling package in the running shuttle, and means whereby upon successive replenishment indications said plurality of spare shuttles are brought one after another into the place of the running shuttle.

129. A weft replenishing loom having a filling package feeler comprising a feeler casing 47, a feeler slide 53 mounted in said casing, a feeler slide 65 also mounted in said casing and adapted to feel for the edge of the filling package, and means exterior to said package to hold it in position in the shuttle until the feeler slide 65 finds said edge.

130. A weft replenishing loom having means to discharge the spent shuttle by moving it across the loom above the shed and a receptacle for the running-shuttle-surface of the lay and into which said spent shuttle is directly received at the end of its movement across the loom above the shed.

131. A loom having means to introduce a new shuttle into the loom by picking it across said loom outside the shed into the box at the opposite side of said loom, and a coöperating signal to indicate impending picking of said shuttle across the loom in the replenishment operation already initiated.

132. A weft replenishing loom having a cycle controlling shaft, driving means for said shaft, means to feel for the weft, an axially movable member operatively connected to said weft feeling means and also to said driving means, means to move said axially movable member upon feeling indication, picking mechanism, and operative connections between said picking mechanism and said cycle controlling shaft.

133. A weft replenishing loom having means to discharge the spent shuttle by moving it across the loom, and a receptacle for the running shuttle surface of the lay and into which said spent shuttle is directly received at the end of its movement across the loom, said receptacle being in front of the shuttle box at that side of the loom where said receptacle is located, and means to introduce a new shuttle by picking it across the loom to that side of the loom where said receptacle is located.

134. A weft-replenishing loom having a cycle controlling shaft, driving means for said shaft, means to feel for the weft, a member operatively connected to said weft-feeling means and also to said driving means, means to move said member upon feeling indication and thereby to render said driving means active, and supplemental picking means operatively connected to said member to effect the introduction of a new weft supply at that side of the loom opposite to said weft-feeling means.

In testimony whereof, I have signed my name to this specification.

LOUIS S. BURBANK.